(12) United States Patent
Hamamoto

(10) Patent No.: US 7,457,384 B2
(45) Date of Patent: Nov. 25, 2008

(54) DIVERSITY METHOD AND APPARATUS, AND RECEIVING METHOD AND APPARATUS

(75) Inventor: Katsuaki Hamamoto, Oogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 606 days.

(21) Appl. No.: 11/235,241

(22) Filed: Sep. 27, 2005

(65) Prior Publication Data

US 2006/0067444 A1 Mar. 30, 2006

(30) Foreign Application Priority Data

Sep. 28, 2004 (JP) ............................. 2004-281036
Sep. 28, 2004 (JP) ............................. 2004-281037

(51) Int. Cl.
*H04L 1/02* (2006.01)

(52) U.S. Cl. ..................................... 375/347

(58) Field of Classification Search ................. 375/267, 375/299, 347, 349; 700/53; 455/101, 132, 455/133, 134, 135, 136, 137, 138, 139, 140, 455/141
See application file for complete search history.

(56) References Cited

U.S. PATENT DOCUMENTS

| | | | |
|---|---|---|---|
| 6,021,125 A * | 2/2000 | Sakoda et al. ............... 370/345 |
| 6,580,705 B1 | 6/2003 | Riazi et al. | |
| 7,327,795 B2 * | 2/2008 | Oprea ........................ 375/260 |
| 2004/0218685 A1* | 11/2004 | Rainbolt et al. ............. 375/267 |

FOREIGN PATENT DOCUMENTS

| | | |
|---|---|---|
| JP | 09-298566 | 11/1997 |
| JP | 2000-269929 | 9/2000 |
| JP | 2001-102967 | 4/2001 |
| JP | 2001-177459 | 6/2001 |
| JP | 2003-318869 | 11/2003 |

OTHER PUBLICATIONS

Coleri, et al., "Channel Estimation Techniques Based on Pilot Arrangement in OFDM Systems", *IEEE Transactions on broadcasting*, vol. 48, No. 3, pp. 223-229, Sep. 2002.
Japanese Office Action, with English Translation, issued in corresponding Japanese Patent Application No. JP 2004-281036, mailed on Dec. 18, 2007.
Japanese Office Action, with English Translation, issued in corresponding Japanese Patent Application No. JP 2004-281036, mailed on Feb. 19, 2008.

* cited by examiner

*Primary Examiner*—Sam K Ahn
(74) *Attorney, Agent, or Firm*—McDermott Will & Emery LLP

(57) ABSTRACT

A derivation unit derives SNRs corresponding respectively to two repeated OFDM symbols having the same content. The derivation unit generates, from the derived SNRs, a control signal necessary for deriving weighting factors and then outputs this control signal as a combined control signal. An FFT unit performs FFT on a signal combined by a delay symbol synthesizing unit. An equalization unit performs equalization processing on subcarrier signals inputted from the FFT unit. While associating two weighting factors with OFDM symbols of the same content, a synthesis unit weights the OFDM symbols of the same content with the weighting factors and then combines the OFDM symbols of the same content among equalization data.

18 Claims, 15 Drawing Sheets

FIG.3A

| D1 | D2 | D3 | D4 |

FIG.3B

| D1 | GI | D2 | GI | D3 | GI | D4 | GI |

BAND 1 — BAND 2 — BAND 1 — BAND 2

FIG.3C

| D1 | GI | D1' | GI | D2 | GI | D2' | GI |

BAND 1 — BAND 2 — BAND 1 — BAND 2

| COMBINED CONTROL SIGNAL | ANTERIOR-SYMBOL FACTOR | POSTERIOR-SYMBOL FACTOR |
|---|---|---|
| 10:1 | A1 | B1 |
| 5:1 | A2 | B2 |
| | | |
| 1:10 | AN | BN |

| SNR (dB) | REGION |
|---|---|
| $A_1$ | $\theta_1$ |
| $A_2$ | $\theta_2$ |
| $A_N$ | $\theta_N$ |

80

DIVERSITY METHOD AND APPARATUS, AND RECEIVING METHOD AND APPARATUS

BACKGROUND OF THE INVENTION

1. Field of the Invention

The present invention relates to the diversity technologies and particularly to a diversity method and apparatus for combining two received signals. The present invention also relates to the receiving techniques and particularly to a receiving method and apparatus for receiving signals via a time-varying radio channel.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been used in the wireless standards such as IEEE802.11a and HIPERLAN/2. The burst signals in such a wireless LAN are generally received via a time-varying channel environment and are also subject to the effect of frequency selective fading. Hence, a receiving apparatus must carry out the channel estimation dynamically. In order for the receiving apparatus to carry out the channel estimation, two kinds of known signals are provided. One is the known signal, provided for all carries in the beginning of the burst signal, which is the so-called preamble or training signal. The other one is the known signal, provided for part of carriers in the data area of the burst signal, which is the so-called pilot signal (See Reference (1) in the following Related Art List, for instance).

Related Art List (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In the field of the wireless communications, the spread-spectrum (SS) communication scheme has been considered conventionally. The SS communication scheme includes direct sequence (DS) scheme and frequency hopping (FH) scheme. In the FH scheme, the frequency of a carrier is hopped in sequence based on a code sequence so as to carry out the spread-spectrum communication. Thus, the spectrum distribution occupies a wide band when observed for a long period of time. On the other hand, the signal thereof occupies a specific frequency band only when observed for each bit or symbol and it is narrower in band than that of the DS scheme. Hence, the FH scheme is said to be an SS of interference-avoidance type. This is advantageous in that the probability under which a plurality of users communicate at the same timing is small.

The MB-OFDM scheme, in which this FH scheme and the above-mentioned OFDM modulation scheme are combined together, has been proposed and is applied to WPAN (Wireless Personal Area Network). WPAN is a wireless network whose range is narrower than the wireless LAN and is a close-range network and may be constituted by PDA and peripheral equipment, for example. In UWB (Ultra Wideband) using such a modulation scheme as MB-OFDM modulation scheme, the use of band of 3.1 GHz to 10.6 GHz is scheduled.

The first problem is as follows. The MB-OFDM modulation scheme supports a plurality of kinds of data transmission rates. Under these circumstances, if the data transmission rate is low, the same symbols are transmitted consecutively. There may be cases where the signal strength or signal-to-noise ratio for the consecutively transmitted symbols differs. In such a case, the combining gain drops. This is because if these symbols are combined as they are, the symbol whose signal strength or signal-to-noise ratio is smaller than the other symbols has an adverse effect on the synthesis.

The second problem is as follows. The radio channel through which the data is transmitted varies with time. Since the FH scheme is used in UWB, the signal strength or signal-to-noise ratio differs for each symbol. If the receiving processing based on the same reference is performed on the symbols in which the signal strength or signal-to-noise ratio differs, it is likely that the error will be caused in the symbol whose signal strength or signal-to-noise ratio is lower than the other symbols. This also makes it difficult to correct the errors even if some error-correcting method is employed, and therefore there will be cases where the quality of data transmission deteriorates.

SUMMARY OF THE INVENTION

The present invention has been made in view of the foregoing circumstances and problems and an objective thereof is to provide a diversity method and apparatus by which to prevent the drop of symbol combining gain if the same symbols are transmitted and the quality of those symbols differs.

Another objective of the present invention is to provide a receiving method and apparatus by which to prevent the occurrence of errors if the effect of noise differs for each of the received signals.

In order to solve the above problems, a diversity apparatus according to a preferred embodiment of the present invention comprises: an input unit which inputs a signal in which a symbol having the same content is repeated a predetermined number of times; a derivation unit which derives weighting factors, the number of which corresponds to the predetermined number of times, by reflecting signal strength corresponding respectively to the symbols of the same content repeated the predetermined number of times; and a synthesis unit which combines the symbols of the same content in a manner such that the weighting factors, the number of which corresponds to the predetermined number of times, are associated with the symbols of the same content repeated the predetermined number of times and at the same time the symbols of the same content are weighted respectively with the weighting factors the number of which corresponds to the predetermined number of times.

According to this embodiment, the weighting factors corresponding respectively to the symbols of the same content repeated a predetermined number of times reflect the signal strength of the respective symbols of the same content. Thus, even if one of the symbols having the same content is inferior to the other in quality, the deterioration of combining gain of the symbols can be suppressed.

The derivation unit may update the weighting factors, symbol by symbol, by reflecting the signal strength per symbol. In this case, the weighting factors conforming to fluctuations in a radio channel can be derived.

The signal inputted to the input unit has undergone frequency hopping, and the derivation unit may derive weighting factors in units of hopping frequency, respectively, by reflecting signal strength corresponding respectively to a plurality of hopping frequencies defined in the frequency hopping. In this case, the weighting factors corresponding to the frequency hopping can be derived.

The signal inputted to the input unit is a burst signal containing a plurality of symbols, and the derivation unit may derive weighting factors in units of hopping frequency, respectively, during a partial period of the burst signal. In this case, what needs to be derived is the weighting factors during a partial period of the burst signal, so that the processing time can be shortened.

Another preferred embodiment according to the present invention relates also to a diversity apparatus. This diversity apparatus comprises: an input unit which inputs a signal in which a symbol having the same content is repeated a predetermined number of times; a derivation unit which derives weighting factors, the number of which corresponds to the predetermined number of times, by reflecting signal-to-noise ratios corresponding respectively to the symbols of the same content repeated the predetermined number of times; and a synthesis unit which combines the symbols of the same content in a manner such that the weighting factors, the number of which corresponds to the predetermined number of times, are associated with the symbols of the same content repeated the predetermined number of times and at the same time the symbols of the same content are weighted respectively with the weighting factors the number of which corresponds to the predetermined number of times. Each symbol in signals inputted to the input unit is formed by a transmission interval and a non-transmission interval, and the derivation unit derives a signal-to-noise ratio from signal strength in a transmission interval and a non-transmission interval in one symbol.

"Transmission interval" is an interval during which a transmission apparatus transmits some signals, whereas "non-transmission interval" is an interval during which the transmission apparatus does not transmit any signal. Specifying these intervals may be done at the transmission apparatus. Hence, there may be a case where the receiving apparatus receives no signal during the "transmission interval" or it receives some signal during the "non-transmission interval".

According to this embodiment, the weighting factors corresponding respectively to the symbols of the same content repeated a predetermined number of times reflect the signal-to-noise ratios corresponding respectively to the symbols of the same content. Thus, even if one of the symbols having the same content is inferior to the other in quality, the deterioration of combining gain of the symbols can be suppressed.

Each symbol in signals inputted to the input unit uses a plurality of carriers, and the synthesis unit may combine the symbols of the same content for each of the carriers. In this case, the present invention can be applied to diversity apparatus designed for multicarrier signals.

Still another preferred embodiment according to the present invention relates to a diversity method. This diversity method is characterized in that a signal in which a symbol having the same content is repeated a predetermined number of times is inputted, weighting factors corresponding respectively to the symbols having the same content are derived, and the symbols having the same content are combined by weighting the symbols having the same content with the weighting factors.

Still another preferred embodiment according to the present invention relates also to a diversity method. This diversity method is characterized in that a signal in which a symbol having the same content is repeated a predetermined number of times, the signal being formed by a transmission interval and a non-transmission interval, is inputted, weighting factors corresponding respectively to the symbols having the same content repeated the predetermined number of times are derived by reflecting signal-to-noise ratios wherein the signal-to-noise ratios correspond respectively to the symbols of the same content repeated the predetermined number of times and the signal-to-noise ratios have been calculated from signal strength in a transmission interval and a non-transmission interval of one symbol, and the symbols of the same content are combined respectively by weighting the symbols of the same content with the weighting factors.

Still another preferred embodiment according to the present invention relates also to a diversity method. This diversity method comprises: inputting a signal in which a symbol having the same content is repeated a predetermined number of times; deriving weighting factors, the number of which corresponds to the predetermined number of times, by reflecting signal strength corresponding respectively to the symbols of the same content repeated the predetermined number of times; and combining the symbols of the same content by weighting respectively the symbols of the same content with the weighting factors.

The deriving may be such that the weighting factors are updated, symbol by symbol, by reflecting the signal-to-noise ratios per symbol. The signal inputted to the inputting has undergone frequency hopping, and the deriving may be such that weighting factors in units of hopping frequency are derived respectively by reflecting signal-to-ratios corresponding respectively to a plurality of hopping frequencies defined in the frequency hopping. The signal inputted to the inputting is a burst signal containing a plurality of symbols, and the deriving may be such that the weighting factors in units of hopping frequency are derived respectively during a partial period of the burst signal.

Still another preferred embodiment according to the present invention relates also to a diversity method. This diversity method comprises: inputting a signal in which a symbol having the same content is repeated a predetermined number of times; deriving weighting factors, the number of which corresponds to the predetermined number of times, by reflecting signal-to-noise ratios corresponding respectively to the symbols having the same content repeated the predetermined number of times; and combining the symbols of the same content in a manner such that the weighting factors, the number of which corresponds to the predetermined number of times, are associated with the symbols of the same content repeated the predetermined number of times and at the same time the symbols of the same content are weighted respectively with the weighting factors the number of which corresponds to the predetermined number of times. Each of signals inputted to the inputting is formed by a transmission interval and a non-transmission interval, and the deriving is such that a signal-to-noise ratio is derived from signal strength in a transmission interval and a non-transmission interval in one symbol.

The deriving may be such that the weighting factors are updated, symbol by symbol, by reflecting the signal-to-noise ratios per symbol. The signal inputted to the inputting has undergone frequency hopping, and the deriving may be such that weighting factors in units of hopping frequency are derived respectively by reflecting signal-to-ratios corresponding respectively to a plurality of hopping frequencies defined in the frequency hopping. The signal inputted to the inputting is a burst signal containing a plurality of symbols, and the deriving may be such that the weighting factors in units of hopping frequency are derived respectively during a partial period of the burst signal.

Still another preferred embodiment according to the present invention relates to a receiving apparatus. This receiving apparatus comprises: a receiver that receives a signal which has undergone a predetermined coding and a phase modulation; a derivation unit which derives signal strength corresponding to the signal received by the receiver; an adjustment unit which adjusts the size of a plurality of partial regions, respectively, according to the signal strength derived by the derivation unit wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions; a transformation unit which performs a transform on a value of received signal in such a manner as to maintain the phase of received signal if the received signal belongs to any of the plurality of partial regions, and which performs a transform on the value of received signal in such a manner as to bring it close to the phase of a middle among the signal points serving as reference for the phase-modulated signal if the received signal does not belong to any of the plurality of partial regions; and a decoding unit which decodes a signal transformed by the transformation unit.

"Transforming the phase of received signal in such a manner as to maintain the phase of received signal" corresponds to transforming the phase of received signal so that the phase of received signal does not change greatly. For instance, suppose that the received signal has an in-phase component and a quadrature component and they are quantized by a few bits. Then, if there lies a value which is close to the phase value, the bit values corresponding respectively to the in-phase component and the quadrature component may be transformed to another values.

According to this embodiment, the size of partial regions is adjusted according to the signal strength of received signal and it is adjusted to a value that can be determined to be a plurality of signal points if the signal points of received signal do not belong to the partial regions. Thus, even if the signal strength of received signal becomes small, the value that can be determined to be a plurality of signal points is outputted by narrowing the size of partial region, so as to prevent the occurrence of errors.

The derivation unit may derive the signal strength for each signal, and the adjustment unit may adjust, for each signal, the size of the partial regions. In this case, the size of partial regions can be so adjusted as to conform to fluctuations in a radio channel.

The signal received by the receiver has undergone frequency hopping, the derivation unit may derive the signal strength corresponding respectively to a plurality of hopping frequencies defined by the frequency hopping, and the adjustment unit may adjust, for each hopping frequency, the size of the partial regions. In this case, the size of partial regions can be adjusted to correspond to the frequency hopping.

The signal received by the receiver is a burst signal containing a plurality of signals, and the derivation unit may derive the signal strength in units of hopping frequency, respectively, during a partial period of the burst signal. In this case, since it is only necessary to derive the signal strength during a partial period of the burst signal, the processing time can be shortened.

A signal having the same content is repeated a predetermined number of times in the signal received by the receiver, the derivation unit derives the signal strength in consideration of the predetermined number of times that the signal having the same content is repeated, and the transformation unit performs the transform on the combined signals of the same content which serve as the received signals. In this case, if a signal having the same content is repeated a predetermined number of times, a diversity effect is obtained as a result of combining these signals and at the same time the size of partial regions can be adjusted.

Still another preferred embodiment according to the present invention relates also to a receiving apparatus. This receiving apparatus comprises: a receiver that receives a signal which has undergone a predetermined coding and a phase modulation; a derivation unit which derives a signal-to-noise ratio corresponding to the signal received by the receiver; an adjustment unit which adjusts the size of a plurality of partial regions, respectively, according to the signal-to-noise ratio derived by the derivation unit wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions; a transformation unit which performs a transform on a value of received signal in such a manner as to maintain the phase of received signal if the received signal belongs to any of the plurality of partial regions, and which performs a transform on the value of received signal in such a manner as to bring it close to the phase of a middle among the signal points serving as reference for the phase-modulated signal if the received signal does not belong to any of the plurality of partial regions; and a decoding unit which decodes a signal transformed by the transformation unit. Each signal received by the receiver is formed by a transmission interval and a non-transmission interval, and the derivation unit may derive a signal-to-noise ratio from signal strength in a transmission interval and a non-transmission interval in each signal.

"Transmission interval" is an interval during which a transmission apparatus transmits some signals, whereas "non-transmission interval" is an interval during which the transmission apparatus does not transmit any signal. Specifying these intervals may be done at the transmission apparatus. Hence, there may be a case where the receiving apparatus receives no signal during the "transmission interval" or it receives some signal during the "non-transmission interval".

According to this embodiment, the size of partial regions is adjusted according to the signal-to-noise ratio of received signal and it is adjusted to a value that can be determined to be a plurality of signal points if the signal points of received signal do not belong to the partial regions. Thus, even if the signal-to-noise ratio of received signal becomes small, the value that can be determined to be a plurality of signal points is outputted by narrowing the size of partial region, so as to prevent the occurrence of errors.

Each of signals received by the input unit uses a plurality of carriers, and the transform unit performs a transform on a plurality of carriers, respectively. In this case, the present invention can be applied to receiving apparatus designed for multicarrier signals.

Still another preferred embodiment according to the present invention relates to a receiving method. This receiving method comprises: receiving a signal which has undergone a predetermined coding and a phase modulation; deriving signal strength corresponding to the received signal; adjusting the size of a plurality of partial regions, respectively, according to the signal strength derived by the deriving wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions; performing a transform on a value of received signal in such a manner as to maintain the phase of received signal if the received signal belongs to any of the plurality of partial regions, and performing a transform on the value of received signal in such a manner as to bring it close to the phase of a middle among the signal points serving as reference for the phase-modulated signal if the received signal does not belong to any of the plurality of partial regions; and decoding a signal transformed by the performing a transform.

The deriving may be such that the signal strength is derived for each signal, and the adjusting may be such that the size of the partial regions may be adjusted for each signal. The signal received in the receiving has undergone frequency hopping, the deriving may be such that signal strengths corresponding respectively to a plurality of hopping frequencies defined by the frequency hopping are derived, and the adjusting may be such that the size of the partial regions is adjusted for each hopping frequency. The signal received in the receiving is a burst signal containing a plurality of signals, and the deriving may be such that the signal strength is each derived in units of hopping frequency during a partial period of the burst signal. A signal having the same content is repeated a predetermined number of times in the signal received by the receiving, the deriving may be such that the signal strength is derived in consideration of the predetermined number of times that the signal having the same content is repeated, and the performing a transform may be such that the transform is performed on the combined signals of the same content which serve as the received signals.

Still another preferred embodiment according to the present invention relates also to a receiving method. This receiving method comprises: receiving a signal which has undergone a predetermined coding and a phase modulation; deriving a signal-to-noise ratio corresponding to the received signal; adjusting the size of a plurality of partial regions, respectively, according to the signal-to-noise ratio derived by the deriving wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions; performing a transform on a value of received signal in such a manner as to maintain the phase of received signal if the received signal belongs to any of the plurality of partial regions, and performing a transform on the value of received signal in such a manner as to bring it close to the phase of a middle among the signal points serving as reference for the phase-modulated signal if the received signal does not belong to any of the plurality of partial regions; and decoding a signal transformed by the performing a transform. Each signal received in the receiving is formed by a transmission interval and a non-transmission interval, and the deriving may be such that a signal-to-noise ratio is derived from signal in a transmission interval and a non-transmission interval in each signal.

The deriving may be such that the signal strength is derived for each signal, and the adjusting may be such that the size of the partial regions may be adjusted for each signal. The signal received in the receiving has undergone frequency hopping, the deriving may be such that signal-to-noise ratios corresponding respectively to a plurality of hopping frequencies defined by the frequency hopping are derived, and the adjusting may be such that the size of the partial regions is adjusted for each hopping frequency. The signal received in the receiving is a burst signal containing a plurality of signals, and the deriving may be such that the signal-to-noise ratios are derived in units of hopping frequency, respectively, during a partial period of the burst signal. A signal having the same content is repeated a predetermined number of times in the signal received by the receiving, the deriving may be such that the signal-to-noise ratio is derived in consideration of the predetermined number of times that the signal having the same content is repeated, and the performing a transform may be such that the transform is performed on the combined signals of the same content which serve as the received signals. Each of the signals received by the receiving uses a plurality of carriers, and the performing a transform may be such that the transform is performed on the carriers, respectively.

It is to be noted that any arbitrary combination of the above-described structural components and the phraseologies according to the present invention changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A to 3C illustrate each a structure of signal symbols received by the receiving apparatus of FIG. 1.

FIG. 15 illustrates a structure of data stored in a threshold value table of FIG. 13.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

Before describing the present invention in a concrete manner in conjunction with a first embodiment, an outline of the present invention will be described first. A first embodiment according to the present invention relates to a receiving apparatus in a communication system where the frequency hopping is carried out symbol by symbol. The OFDM scheme is applied to the symbols to which the frequency hopping is done, and the communication system according to the present embodiment is designed for the UWB that uses the MB-OFDM modulation scheme. In the communication system according to the present embodiment, two continuous symbols having the same content are transmitted. Thus, the symbols having the same content are transmitted at different time and at different frequencies. A receiving apparatus obtains a diversity effect by synthesizing the symbols having the same content when demodulating received signals. In so doing, signal-to-noise ratios (hereinafter abbreviated as SNRs also) corresponding to the two symbols of the same content, respectively, are derived and weighting factors are derived, respectively, from the SNRs. The receiving apparatus gives weights by the weighting factors corresponding to the symbols of the same content, respectively, and then synthesizes the symbols of the same content.

Figure 1:
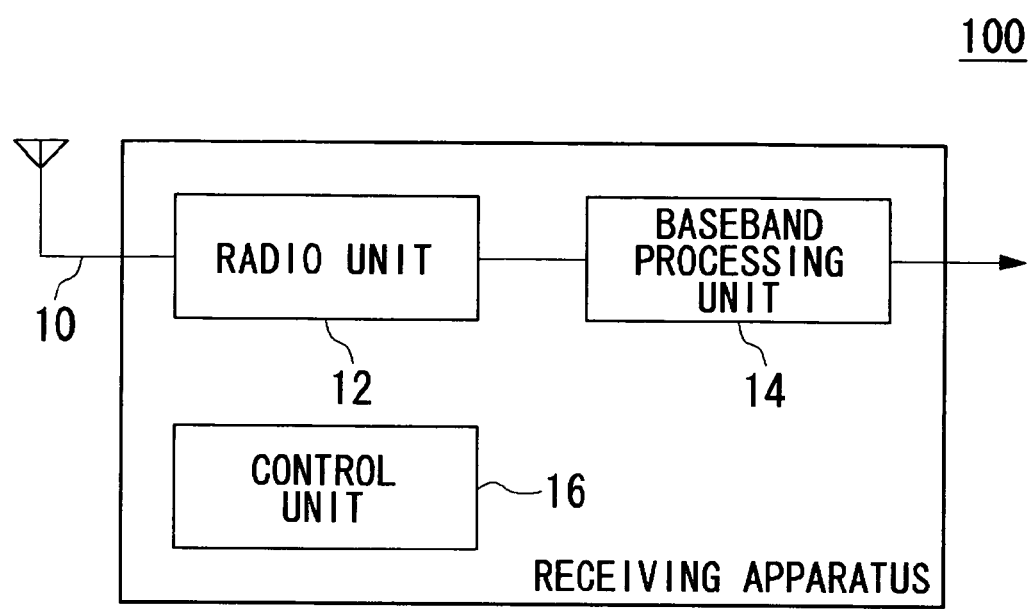
FIG. 1 illustrates a structure of a receiving apparatus according to a first embodiment of the present invention.

FIG. 1 shows a structure of a receiving apparatus 100 according to the present embodiment. The receiving apparatus 100 includes an antenna 10, a radio unit 12, a baseband processing unit 14 and a control unit 16.

The antenna 10 receives signals via a radio area from a transmitting apparatus, not shown. The OFDM modulation scheme and the FH scheme are applied to the received signals. The respective subcarriers thereof are phase-modulated by QPSK (Quadrature Phase Shift Keying). An OFDM symbol which serves as one unit in the OFDM modulation scheme is subjected to frequency hopping by use of a predetermined hopping pattern. The description on the OFDM symbol will be given later. It is to be noted that a signal received has a predetermined radiofrequency.

The radio unit 12 frequency-converts the radiofrequency received by the antenna 10 into a baseband signal. The radio unit 12 is provided with a code generator to execute frequency hopping by a predetermined hopping pattern, and a pseudo-random code signal generated by the code generator is synchronized to the hopping pattern at the received radiofrequency signal. Using a predetermined method, the code generator carries out synchronization with the hopping pattern at the received radiofrequency signal. Though a baseband signal is generally represented by two components which are an in-phase component and a quadrature component, it is assumed herein that the baseband signal is represented by a single signal line for the clarity of description. The same applies also hereinafter.

The baseband processing unit 14 demodulates baseband signals inputted from the radio unit 12. The OFDM modulation scheme is applied to the baseband signals, so that the baseband processing unit 14 performs FFT (Fast Fourier Transform) on the baseband signals. Though the details will be described later, two continuous OFDM symbols share the same content. Thus, the baseband processing unit 14 performs a diversity processing on these signals. After performing demapping processing corresponding to QPSK, the baseband processing unit 14 carries out deinterleave processing so as to carry out decoding. Corresponding thereto, the interleaving and coding are being carried out in a transmitting apparatus, not shown.

The control unit 16 controls the receiving apparatus 100 in its entirety so that the receiving apparatus 100 can carry out a predetermined processing. In particular, the control unit 16 controls the timings in the receiving apparatus 100.

Figure 2:
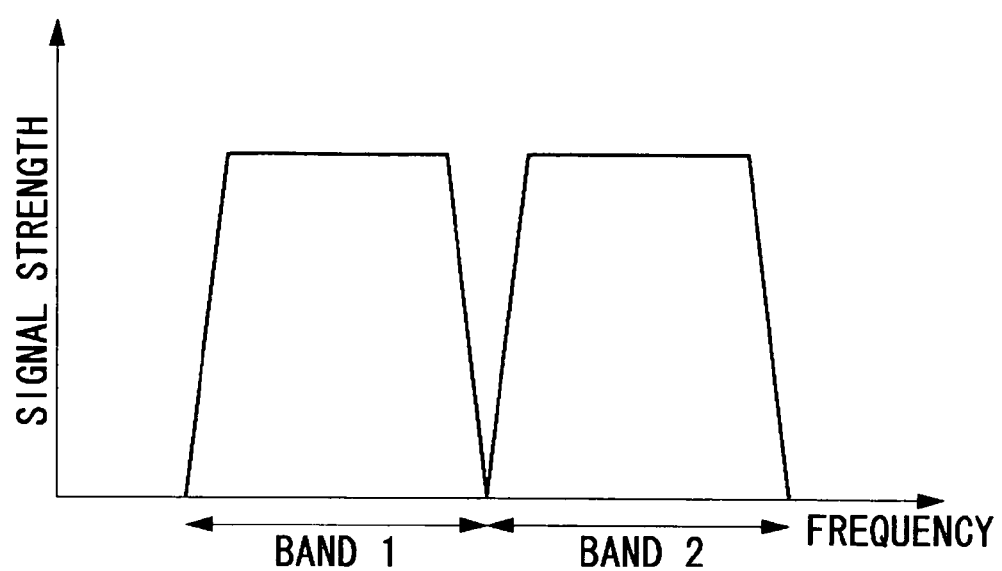
FIG. 2 illustrates hopping frequencies of signals received by the receiving apparatus of FIG. 1.

FIG. 2 shows hopping frequencies of signals received by the receiving apparatus 100. For the brevity of explanation, two frequencies, namely, "band 1" and "band 2" are used here as shown in FIG. 2. The signal of "band 1" is further OFDM-modulated. The communication system in the present embodiment uses frequency hopping, so that "band 1" and "band 1" are switched at a predetermined timing and then used. For the brevity of description, "band 1" and "band 2" are switched alternately and used here. That is, used is a hopping pattern such as "band 1", "band 2", "band 1" and "band 2".

FIGS. 3A to 3C show each a structure of signal symbols received by the receiving apparatus 100. FIG. 3A shows a signal which has been subjected to IFFT in a transmitting apparatus (hereinafter referred to as "IFFT signal"). In the transmitting apparatus, a radiofrequency signal is subjected to IFFT so as to be converted to a time-domain signal. Here, IFFT at a transmitting apparatus and FFT at a receiving apparatus are both executed with 128 data as a unit, namely, as an FFT window (hereinafter the timing corresponding to a single one of 128 data will be called an "FFT point"). In FIG. 3A, data composed of 128 FFT points are represented as "D1", "D2", "D3" and "D4" in sequence of time.

FIG. 3B shows signals in which guard intervals (GI) are respectively added to the IFFT signals shown in FIG. 3A. Referring to FIG. 3B, "GI" is each added posterior to "D1", "D2", "D3" and "D4" which are each composed of 128 FFT points. Here, "GI" corresponds to part in which no signal is transmitted, namely, a non-transmission interval. The combination of 128 FFT point data with "GI" is called the aforementioned "OFDM symbol". For example, a set of "D1" and "GI" corresponds to a single OFDM symbol. The same is true for "D2", "D3" and "D4".

As described above, the frequency hopping is carried out by alternately switching the hopping frequency per OFDM symbol. Thus, as shown in FIG. 3B, the first "D1" and "GI" is transmitted by "band 1" and the next "D2" and "GI" is transmitted by "band 2". Then the next "D3" and "GI" is transmitted by "band 1", and then "D4" and "GI" is transmitted by "band 2". Hereinafter, the "OFDM symbol" is used for not only the time-domain signal but also for a frequency-domain signal. If the "OFDM symbol" is used for the frequency-domain signal, the "GI" may be removed.

Similar to FIG. 3B, FIG. 3C shows signals in which GIs are respectively added to the IFFT signals. However, FIG. 3C corresponds to a case when the data transmission rate is lower than the data transmission rate of FIG. 3B among a plurality of data transmission rates defined in UWB. "D1" and "D1'" have the same content and "D2" and "D2'" have the same content in FIG. 3C. That is, the OFDM symbols having the same content are transmitted in two continuous OFDM symbols. Since in this manner the two OFDM symbols having the same content are transmitted in sequence, the data transmission rate becomes ½ but a time diversity effect is obtained. Furthermore, since the hopping frequencies of the two OFDM symbols transmitted in sequence differ, a frequency diversity effect is also obtained. For example, "D1" and "GI" are transmitted by "band 1" whereas "D1'" and "GI" are transmitted by "band 1". A signal having the form as shown in FIG. 3C is the signal to be processed in the receiving apparatus 100 of FIG. 1.

Figure 4A:
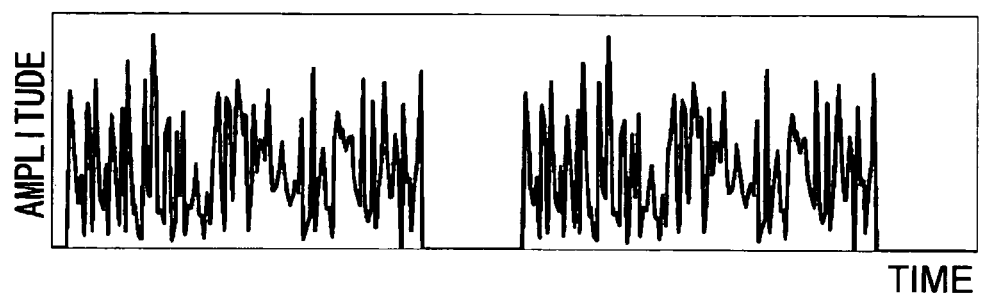
FIGS. 4A and 4B illustrate waveforms of signals received by the receiving apparatus of FIG. 1.
Figure 4B:
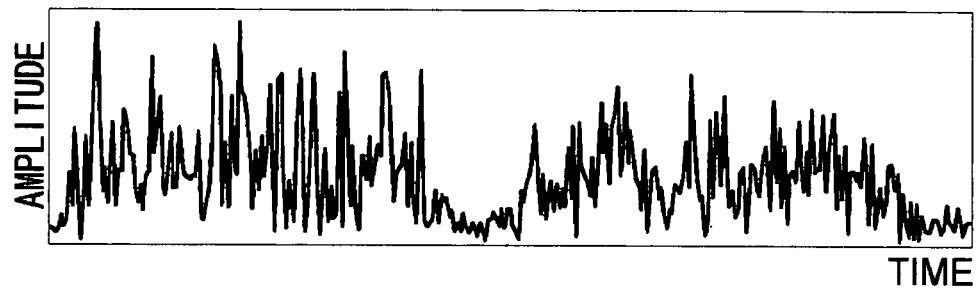

FIGS. 4A and 4B illustrate waveforms of signals received by the receiving apparatus 100. FIG. 4A shows a waveform of a signal corresponding to that of FIG. 3B or FIG. 3C. As shown in FIGS. 4A and 4B, an OFDM symbol is formed by the repeat of a transmission interval corresponding to an IFFT signal and a non-transmission interval corresponding to a GI. FIG. 4B shows a signal waveform obtained when the signal of FIG. 4A is received by the antenna 10 via a radio channel. A delayed wave is caused in the radio channel, so that the antenna 10 receives a predetermined signal also in a GI interval. However, the signal strength in the GI interval is smaller than that in the IFFT signal interval.

Figure 5:
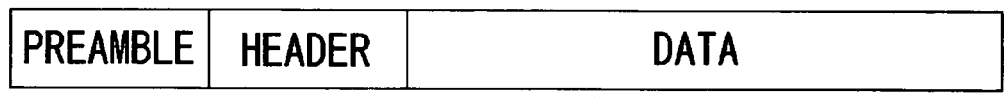
FIG. 5 illustrates a burst format of signal received by the receiving apparatus of FIG. 1.

FIG. 5 illustrates a burst format of signal received by the receiving apparatus 100. In the burst signal, "preamble", "header" and "data" are placed in this order starting from the top. The "preamble", "header" and "data" are each formed by a predetermined number of OFDM symbols or IFFT signals. In this burst signal formed by the "preamble", "header" and "data", a predetermined deformation or modification may be made to the OFDM symbols or IFFT signals. The "preamble" is a known signal used by the receiving apparatus 100 when the receiving apparatus 100 carries out the timing synchronization or channel estimation. The "header" is a control signal and the "data" is information to be transmitted from a transmitting apparatus, not shown.

Figure 6:
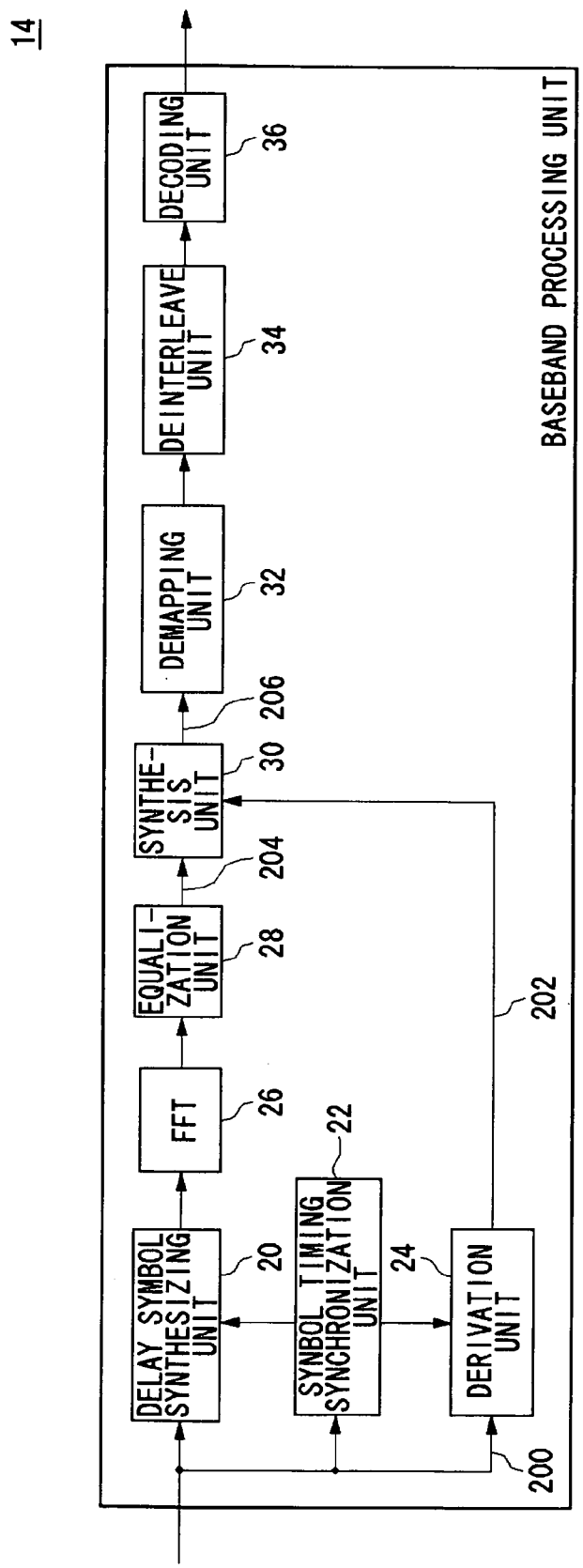
FIG. 6 illustrates a structure of a baseband processing unit shown in FIG. 1.

FIG. 6 illustrates a structure of a baseband processing unit 14. The baseband processing unit 14 includes a delay symbol synthesizing unit 20, a symbol timing synchronization unit 22, a derivation unit 24, an FFT unit 26, an equalization unit 28, a synthesis unit 30, a demapping unit 32, a deinterleave unit 34 and a decoding unit 36. Signals involved therein include a received signal 200, a combined control signal 202, equalization data 204 and combined data 206.

As shown in FIG. 3C or FIG. 4B, a signal in which the OFDM symbol of the same content is repeated a predetermined number of times is inputted to the baseband processing unit 14. Here, assume that the predetermined number of times is two. Of the signals inputted, one OFDM symbol is formed by a transmission interval and a non-transmission interval. The transmission interval corresponds to an IFFT signal whereas the non-transmission interval corresponds to a GI (Guard Interval). The inputted signal is subjected to the frequency hopping in units of OFDM symbol. Of the inputted signals, one OFDM symbol uses a plurality of subcarriers. The signal inputted to the baseband processing unit 14 is the received signal 200.

During the period of a preamble in the inputted received signal 200, the symbol timing synchronization unit 22 detects the timing of OFDM symbols contained in the received signal 200. The detection of the timing of OFDM symbols is carried out by correlation processing, for example. That is, the symbol timing synchronization unit 22 is provided thereinside with a matched filter, and a stream of known signals corresponding to a preamble are stored in tap coefficients of the matched filter.

In such a structure as above, when preamble values of the received signal 200 inputted to the matched filter become close to the tap coefficients, respectively, the correlation value becomes large. The symbol timing synchronization unit 22 detects the timing of OFDM symbols by detecting the peak of correlation values. In one OFDM symbol, the symbol timing synchronization unit 22 separates an IFFT signal area from a GI area, that is, it separates the transmission interval from the non-transmission interval. This can be accomplished by counting the number of symbols from a peak position. For instance, a signal corresponding to the IFFT signal area is determined to be an IFFT signal from the peak.

The derivation 24 inputs the received signal 200 and also inputs from the symbol timing synchronization unit 22 the timing of OFDM symbols and information on a boundary between an IFFT signal area and a GI area. Two OFDM symbols of the same content are repeated in the received signal 200, as described earlier. While reflecting the timing of OFDM symbols and the information on the boundary between an IFFT signal area and a GI area, the derivation unit 24 derives SNRs corresponding respectively to the two repeated OFDM symbols of the same content.

The derivation unit 24 derives an SNR from an IFFT signal area and a GI area in one OFDM symbol. A method for deriving the SNR will be discussed later. Since the derivation unit 24 derives the SNR in units of OFDM symbol, this corresponds to driving SNRs corresponding respectively to a plurality of hopping frequencies in the frequency hopping. The derivation unit 24 generates from the thus derived SNR a control signal to derive weighting factors, and outputs this control signal as a combined control signal 202. The combined control signal 202 indicates here a ratio of SNRs between the two OFDM symbols to be combined.

The delay symbol synthesizing unit 20 inputs the received signal 200 and also inputs, from symbol timing synchronization unit 22, the timing of OFDM symbols and the information on a boundary between an IFFT signal area and a GI area. Based on the information on a boundary between an IFFT signal area and a GI area, the delay symbol synthesizing unit 20 separates the OFDM symbol in the received signal 200 into an IFFT signal area and a GI area. Then the delay symbol synthesizing unit 20 combines a delayed wave component received in the GI area with an IFFT signal.

The FFT unit 26 performs FFT on a signal combined in the delay symbol synthesizing unit 20. As a result, time-domain signals are transformed to frequency-domain signals, and the frequency-domain signals correspond respectively to subcarrier signals. Hereinafter, an OFDM symbol corresponds to a frequency-domain signal. It is assumed herein that the number of FFT points is "128" as with the IFFT points.

The equalization unit 28 performs equalization processing on subcarrier signals inputted from the FFT unit 26. That is, since the subcarrier signals contain amplitude distortion and phase distortion due to the multipath delay in the radio channel, such distortion is corrected by the equalization unit 28. The estimation of radio channel is generally needed for the execution of equalization processing. For example, the equalization unit 28 uses an LMS (Least Mean Square) algorithm or the like so as to estimate the radio channel. It is assumed herein that the radio channel is estimated subcarrier by subcarrier. Here, the equalization unit 28 outputs, as equalization data 204, the subcarrier signals on which the equalization processing has been performed.

The synthesis unit 30 inputs a combined control signal 202 from the derivation unit 24 and inputs equalization data 204 from the equalization unit 28. While reflecting the combined control signal 202, the synthesis unit 30 derives weighting factors the number of which corresponds respectively to the number of times that the OFDM symbol of the same content has been repeated. Since the OFDM symbol having the same content is repeated twice here, two weighting factors are derived. The derivation unit 24 updates the weighting factors symbol by symbol, which corresponds to the fact that the weighting factors in units of hopping frequency are derived respectively. While associating the two weighting factors with the OFDM symbols having the same content, the synthesis unit 30 weights the OFDM symbols having the same content with the weighting factors and then combines the OFDM symbols of the same content among the equalization data 204. For each of a plurality of carriers, the synthesis unit 30 combines the two OFDM symbols of the same content. The synthesis unit 30 outputs the combined signal as combined data 206.

The demapping unit 32 demaps the combined data 206 to signal points of QPSK. It is to be noted that the combined data 206 is phase-modulated and the phase modulation scheme used here is QPSK. The demapping unit 32 associates the combined data 206 to a signal point closest thereto among four signals points of QPSK.

The deinterleave unit 34 deinterleaves signals outputted from the demapping unit 32 according to a rule conforming to an interleave rule exercised in a transmitting apparatus (now shown). The decoding unit 36 decodes signals outputted from the deinterleave unit 34. If the coding carried out by a transmitting apparatus (not shown) is the convolutional coding, the decoding unit 36 performs Viterbi decoding. The decoding unit 36 may perform Viterbi decoding based on a hard-decision signal or a soft-decision signal. In such case, the bit numbers of signals from the demapping unit 32 differ.

In terms of hardware, the above-described structure can be realized by a CPU, a memory and other LSIs of an arbitrary computer. In terms of software, it can be realized by memory-loaded programs which have managing and scheduling functions or the like, but drawn and described herein are function blocks that are realized in cooperation with those. Thus, it is understood by those skilled in the art that these function blocks can be realized in a variety of forms such as by hardware only, software only or the combination thereof.

Figure 7:
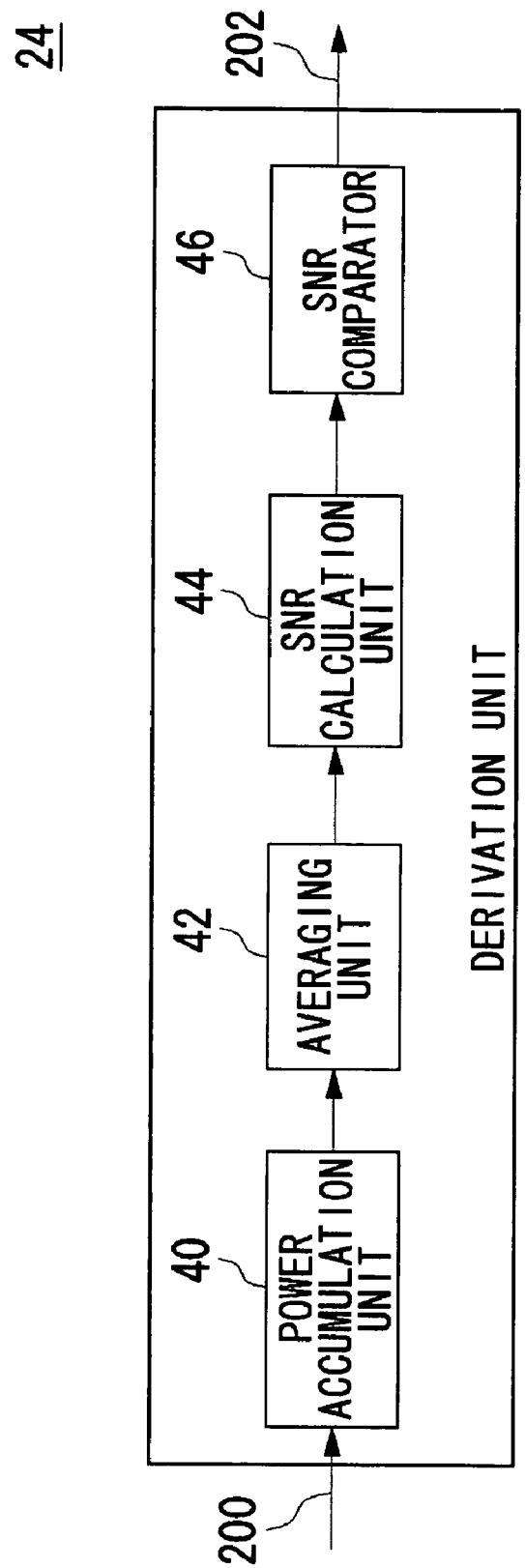
FIG. 7 illustrates a structure of a derivation unit shown in FIG. 6.

FIG. 7 illustrates a structure of a derivation unit 24. The derivation unit 24 includes a power accumulation unit 40, an averaging unit 42, an SNR calculation unit 44 and an SNR comparator 46.

The power accumulation unit 40 accumulates the power for the interval of an IFFT signal inputted in one OFDM symbol. Here, at sampling intervals where the baseband processing unit 14 operates, the power for the interval of an IFFT signa inputted is added up. The power accumulation unit 40 accumulates the power for a GI area in one OFDM symbol. Here, the power for the area of a GI inputted is added up at sampling intervals where the baseband processing unit 14 operates. The separation of the interval of an IFFT signal from the GI area is done based on the information, inputted from the symbol timing synchronization unit 22, on the boundary between the IFFT signal area and the GI area.

The averaging unit 42 averages the power for the interval of an IFFT signal accumulated by the power accumulation unit 40, according to the number of samples or the measurement size. The averaging unit 42 carries out the similar processing in the GI area. In other words, it is difficult to perform a single processing directly on both the accumulated power for the interval of an IFFT signal and the accumulated power for the GI area. This is because the length of the interval of an IFFT signal differs from the length of a GI area. Thus, the averaging unit 42 carries out the averaging processing so that the processing can be executed among these.

The SNR calculation unit 44 inputs from the averaging unit 42 the averaged power for an IFFT signal area and the averaged power for a GI area. In the SNR calculation unit 44, the averaged power for an IFFT signal area is divided by the averaged power for a GI area, so as to derive an SNR. Now, the delay waves are also received in the GI area, so that the averaged power for a GI area differs from the intact noise level. However, since the averaged power for a GI area is generally lower than the averaged power for an IFFT signal area, it is regarded as the proper noise level. As the averaged power for a GI area, the power for a rear part of the GI area may be averaged. In this case, the effect of delayed waves can be reduced.

The SNR comparator 46 inputs the SNR in units of OFDM symbols from the SNR calculation unit 44. Then the SNR comparator 46 compares the two OFDM symbols of the same content and generates a signal indicative of a ratio of the magnitude thereof. For example, the SNR comparator 46 generates a signal indicating the comparison result as "1:2" or the like for the two OFDM symbols. Then the SNR comparator 46 outputs the thus generated signal as the combined control signal 202.

Figure 8:
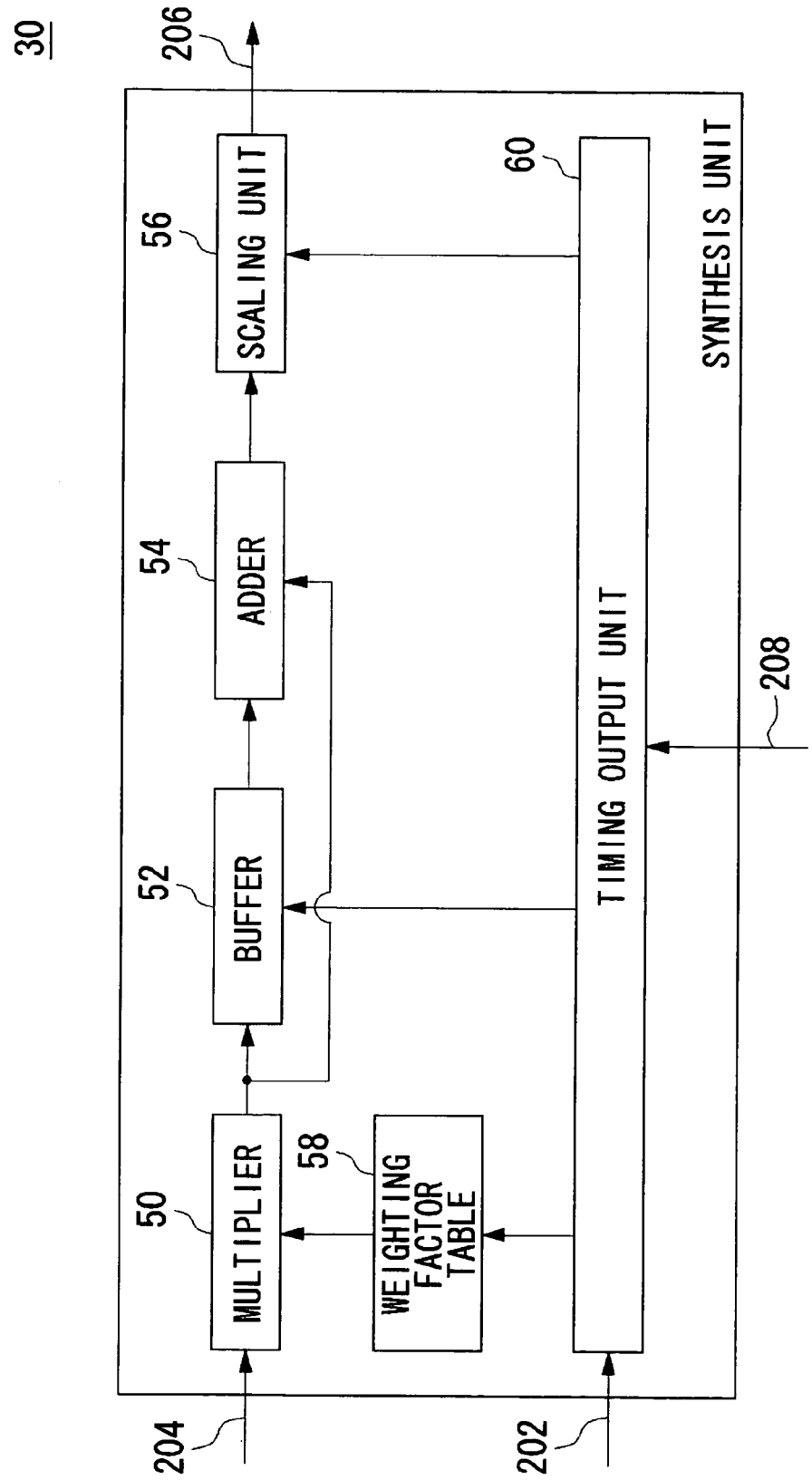
FIG. 8 illustrates a structure of a synthesis unit shown in FIG. 6.

FIG. 8 illustrates a structure of a synthesis unit 30. The synthesis unit 30 includes a multiplier 50, a buffer 52, an adder 54, a scaling unit 56, a weighting factor table 58 and a timing output unit 60. Signals involved include a timing signal 208.

The timing output unit 60 inputs the combined control signal 202 from the derivation unit 24, and inputs the timing signal 208 from the control unit 16. The timing signal 208 is, for example, a signal that indicates the timing of an OFDM symbol. The timing output unit 60 outputs, at a predetermined timing based on the timing signal 208, the inputted combined control signal 202 to the weighting factor table 58. The timing output unit 60 outputs also a timing signal to control the buffer 52 and the scaling unit 56.

The weighting factor table 58 stores beforehand a table in which the ratio of SNRs is associated with the values of two weighting factors. Based on this table, the ratio of SNRs contained in the combined control signal 202 is converted to two weighting factors for the two OFDM symbols of the same content. Since the two OFDM symbols having the same content are assigned contiguously in a time-series manner, the weighting factor table 58 outputs the weighting factors, respectively, in timing with said two OFDM symbols.

Figures 9, 10:
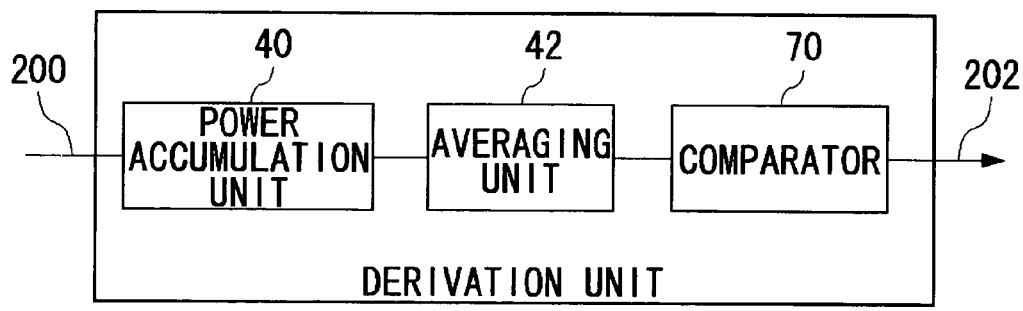
FIG. 9 illustrates a structure of data in a weighting factor table shown in FIG. 6.
FIG. 10 illustrates another structure of the derivation unit shown in FIG. 6.

FIG. 9 illustrates a structure of data in the weighting factor table 58. The column of "combined control signal" corresponds to the ratio of SNRs contained in the combined control signal 202. That is, it is defined like "10:1" as shown in FIG. 9. Of the two OFDM symbols having the same content, "anterior-symbol factor" indicates the weighting factor for one assigned in front thereof, whereas, of the two OFDM symbols having the same content, "posterior-symbol factor" indicates the weighting factor for the other assigned in the back thereof. Here, "A1", "B1" and so forth indicate arbitrary values. With the aforementioned processing, a plurality of weighting factors are so derived here as to reflect the ratio of SNRs.

Referring back to FIG. 8, the multiplier 50 multiplies the equalization data 204 by the weighting factors from the weighting factor table 58. The equalization data 204 includes an OFDM symbol, and the OFDM symbol includes a plurality of subcarrier signals. The multiplier 50 multiplies a plurality of subcarrier signals contained in one OFDM symbol by the same weighting factor. Of the two OFDM symbols having the same content, the multiplier 50 multiplies a symbol assigned in front thereof by the "anterior-symbol factor" and multiplies the other symbol assigned in the back thereof by the "posterior-symbol factor".

The buffer 52 delays the OFDM symbol multiplied by the anterior-symbol factor, during one OFDM symbol period. The adder 54 adds up the OFDM symbol delayed by the buffer 52 and the OFDM symbol outputted from the multiplier 50. The former corresponds to the OFDM symbol multiplied by the "anterior-symbol factor" and the latter corresponds to the OFDM symbol multiplied by the "posterior-symbol factor". Since one OFDM symbol is composed of a plurality of subcarrier signals, the adder 54 carries out addition subcarrier by subcarrier. This addition is equivalent to the combining or synthesis. The scaling unit 56 adjusts the output bit number of signals added by the adder 54. The scaling unit 56 outputs, as the combined data 206, the signal the output bit number of which has been adjusted.

An operation of a receiving apparatus structured as above will be described now. For the signals which have undergone the frequency hopping in units of OFDM symbol, the radio unit 12 converts the frequency thereof from radiofrequency to baseband frequency so as to be outputted as a received signal 200. The symbol timing synchronization unit 22 extracts the timing of OFDM symbols from the symbol timing synchronization unit 22. The derivation unit 24 inputs the timing of OFDM symbols from the symbol timing synchronization unit 22 and calculates an SNR of each OFDM symbol in the received signal 200. Then the derivation unit 24 derives the ratio of SNRs for the two OFDM symbols having the same content and outputs the result thereof as the combined control signal 202. Of the OFDM symbols of the received signal 200, the delay symbol synthesizing unit 20 combines a signal in the IFFT signal area with a signal in the GI area.

The FFT unit 26 performs FFT on the signal combined by the delay symbol synthesizing unit 20. The equalization unit 28 estimates the characteristics of a radio channel from a preamble and equalizes the signal which has undergone FFT in the FFT unit 26, so as to be outputted as equalization data 204. While reflecting the combined control signal 202, the synthesis unit 30 derives weighting factors, respectively, for the two OFDM symbols having the same content. Of the equalization data 204, the two OFDM symbols having the same content are weighted with the weighting factors and then combined, so as to be derived as combined data 206. The demapping unit 32 demaps the combined data 206. The deinterleave unit 34 deinterleaves the signal demapped by the demapping unit 32. The decoding unit 36 decodes the signal deinterleaved by the deinterleave unit 34.

Next, a modified form of the first embodiment will be described. In the first embodiment described so far, the derivation unit 24 calculates SNRs from the received signals 200 to derive the weighting factors. According to this modification, the derivation unit 24 derives signal strength from the received signal 200. Thus, in this modification, the weighting factors can be derived even when the signal is transmitted during a GI period.

FIG. 10 illustrates another structure of the derivation unit 24. The derivation unit 24 includes a power accumulation unit 40, an averaging unit 42 and a comparator 70.

The power accumulation unit 40 accumulates the power in one OFDM symbol. Here, at sampling intervals where the baseband processing unit 14 operates, the power for the interval of an IFFT signal is added up. The averaging unit 42 averages the power, for the interval of an OFDM symbol, accumulated by the power accumulation unit 40 according to the number of samples or the measurement size in the interval of an OFDM symbol.

The comparator 70 inputs the averaged power from the averaging unit 42. Then the comparator 70 compares the powers as the signal strengths for the two OFDM symbols having the same content, and generates a signal indicative of a ratio of their magnitude. The comparator 70 outputs the thus generated signal as a combined control signal 202.

In such a modification as above, a received signal 200 in which an OFDM symbol of the same content is repeated a predetermined number of times is inputted to the baseband processing unit 14. Here, assume that the predetermined number of times are "2" which is the same as with the above-described embodiment. Here, an OFDM symbol is formed by IFFT signals and GIs, and the GI may be in a non-transmission interval or a part of IFFT signal area may be transmitted. In the latter case, the GI may be assigned posterior to the IFFT signal.

While reflecting the signal strength corresponding respectively to the two OFDM symbols having the same content, the derivation unit 24 derives two weighting factors, respectively. Since the derivation unit 24 updates the weighting factors for each symbol by maintaining to reflect the signal strength in units of OFDM symbol, this corresponds to deriving weighting factors for each of a plurality of hopping frequencies while reflecting the signal strength corresponding respectively to the plurality of hopping frequencies defined in the frequency hopping. While associating the two weighting factors with the OFDM symbols of the same content and then weighting the OFDM symbols of the same content with the two weighting factors, the synthesis unit 30 combines the two OFDM symbols of the same content.

According to the first embodiment, the weighting factors, corresponding respectively to the OFDM symbols of the same content repeated a predetermined number of times, reflect the signal-to-noise ratios (SNRs) for the respective OFDM symbols of the same content. Thus, even if one of the OFDM symbols having the same content is inferior to the other in quality, the deterioration of combining gain of the OFDM symbols can be prevented. Furthermore, while reflecting SNRs corresponding respectively to the two OFDM symbols of the same content, the weighting factors are derived and the weighting is done using the thus derived weighting factors so as to combine the two OFDM symbols of the same content. Thus, even if one of the OFDM symbols having the same content is inferior to the other in quality, the deterioration of combining gain of the OFDM symbols can be prevented. Since the SNRs are derived from the power corresponding to respectively to the transmission interval and the non-transmission interval in the OFDM symbol, the SNRs that properly represents the characteristics of a radio channel are measured. The SNRs can be measured in a simplified manner. Since the weighting factors corresponding to the SNRs are used, the combining gain can be improved. The quality of communications can be improved. Since the weighting factors are derived for each symbol, the weighting factors conforming to fluctuations in the radio channel can be derived. The drop in the combining gain of OFDM symbols can be prevented even when there is variation in the radio channel.

Since the weighting factors are derived in units of hopping frequency, weighting factors corresponding to the frequency hopping can be derived. The effect of time diversity and the effect of frequency diversity are achieved. Since the signals are combined subcarrier by subcarrier, the present embodiment can be used in response to mutlicarrier signals. The weighting factors, corresponding respectively to the OFDM symbols of the same content repeated a predetermined number of times, reflect the signal strengths for the respective OFDM symbols of the same content. Thus, even if one of the OFDM symbols having the same content is inferior to the other in quality, the deterioration of combining gain of the OFDM symbols can be prevented. Furthermore, while reflecting the signal strengths corresponding respectively to the two OFDM symbols of the same content, the weighting factors are derived and the weighting is done using the thus derived weighting factors so as to combine the two OFDM symbols of the same content. Thus, even if one of the OFDM symbols having the same content is inferior to the other in quality, the deterioration of combining gain of the OFDM symbols can be prevented. Since the weighting factors are derived while the signal strengths are being reflected, the present embodiment can be applied even when there is no non-transmission interval in the OFDM symbol. Since SNRs are not calculated, the processing can be simplified. The present embodiment can be applied to a variety of communication systems.

Second Embodiment

Before describing the present invention in a concrete manner in conjunction with a second embodiment, an outline of the present invention will be described first. The second embodiment according to the present invention relates to a receiving apparatus in a communication system where the frequency hopping is carried out symbol by symbol. The OFDM scheme is applied to the symbols to which the frequency hopping is done, and the communication system according to the present embodiment is designed for UWB that uses the MB-OFDM modulation scheme. Signals are subjected to coding and phase moudaltion. The characteristics of a radio channel in a communication system according to the present embodiment varies with time. Since the frequency hopping is done, the quality of OFDM symbols differ from one another even though the OFDM symbols are contiguously assigned. That is, the state in which the noise effect becomes larger or the state in which the noise effect becomes smaller may change symbol by symbol.

The receiving apparatus sets beforehand in a demodulation processing a region that does not correspond to any of signal points in the phase modulation when a demapping is carried out. If the signal points of a received signal belong to this region, they are demapped to a value corresponding to a midpoint of a plurality of signal points. Hence, the error correction for the signals that have undergone such a demaping will be easily made in a decoding processing which is carried out in a subsequent stage. In the receiving apparatus according to the present embodiment, a signal-to-noise ratio (SNR) corresponding to a symbol is derived, and the size of a region that does not correspond to any of signal points in the phase modulation is adjusted according to the magnitude of SNRs. That is, if an SNR is small, the noise effect is large, so that the size of the region that does not correspond to any of signal points in the phase modulation is enlarged. A structure of a receiving apparatus 100 according to the second embodiment of the present invention is same as that of FIG. 1.

Figure 11:
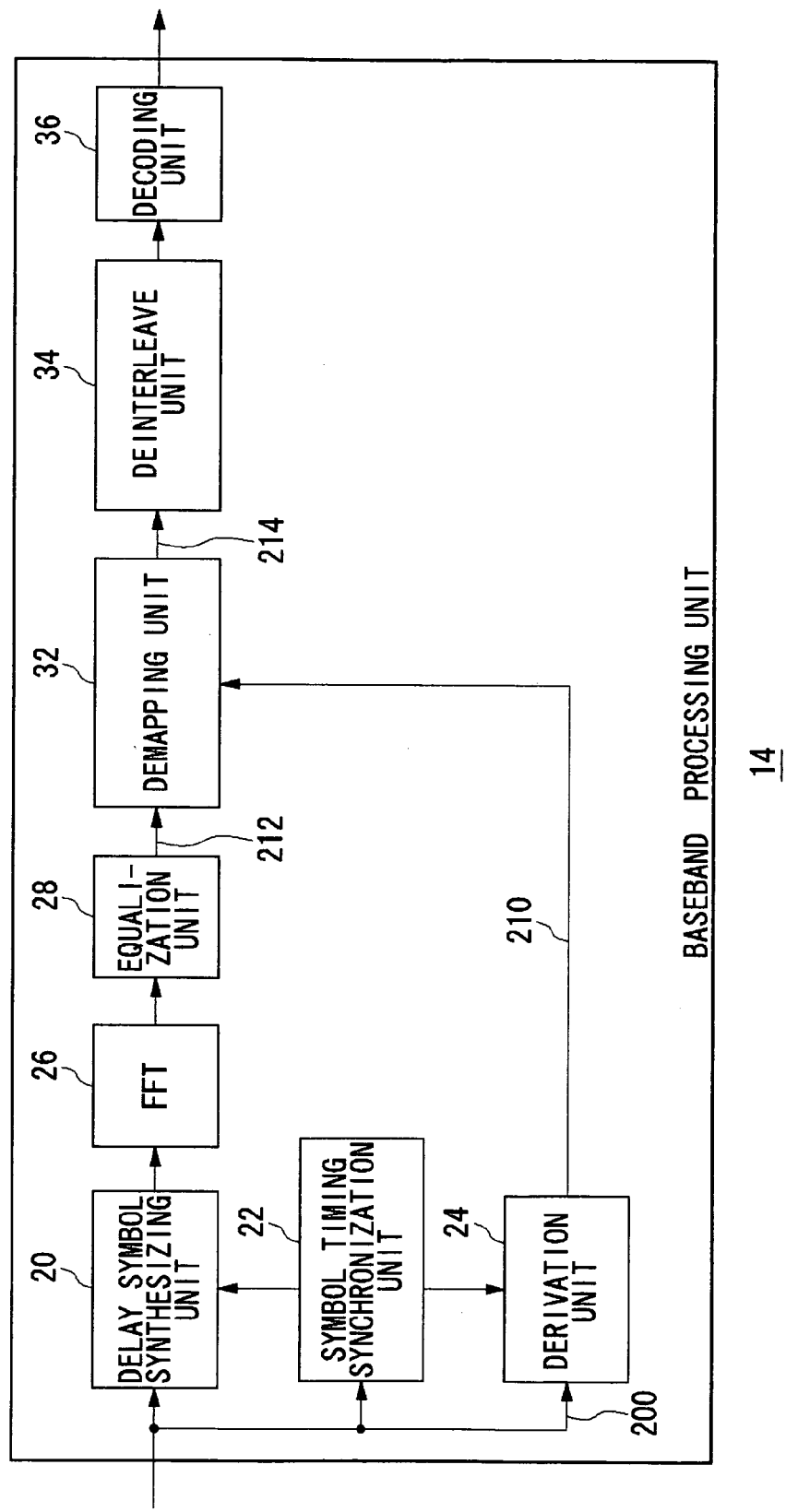
FIG. 11 illustrates a structure of a baseband processing unit shown in FIG. 1.

FIG. 11 illustrates a structure of a baseband processing unit 14. The baseband processing unit 14 includes a delay symbol synthesizing unit 20, a symbol timing synchronization unit 22, a derivation unit 24, an FFT unit 26, an equalization unit 28, a demapping unit 32 a deinterleave unit 34 and a decoding unit 36. Signals involved therein include a received signal 200, a derived-value signal 210, equalization data 212 and demap data 214.

A signal, which has undergone a predetermined coding and a phase modulation, is inputted to the baseband processing unit 14. Here, assume that the predetermined coding is convolutional coding and the phase modulation is QPSK. As shown in FIG. 3B or FIG. 4B, of the signals inputted, one OFDM symbol is formed by a transmission interval and a non-transmission interval. The transmission interval corresponds to an IFFT signal whereas the non-transmission interval corresponds to a GI (Guard Interval). The inputted signal is subjected to frequency hopping in units of OFDM symbol. Of the inputted signals, one OFDM symbol uses a plurality of subcarriers. The signal inputted to the baseband processing unit 14 is the received signal 200.

During the period of a preamble in the inputted received signal 200, the symbol timing synchronization unit 22 detects the timing of OFDM symbols contained in the received signal 200. The detection of the timing of OFDM symbols is carried out by correlation processing, for example. That is, the symbol timing synchronization unit 22 is provided thereinside with a matched filter, and a stream of known signals corresponding to a preamble is stored in the tap coefficients of the matched filter.

In such a structure as above, when preamble values of the received signal 200 inputted to the matched filter become close to the tap coefficients, respectively, the correlation value outputted from the matched filter becomes large. The symbol timing synchronization unit 22 detects the timing of OFDM symbols by detecting the peak of correlation values. In one OFDM symbol, the symbol timing synchronization unit 22 separates an IFFT signal area from a GI area, that is, it separates the transmission interval from the non-transmission interval. This can be accomplished by counting the number of symbols from a peak position. For instance, a signal corresponding to the IFFT signal interval is determined to be an IFFT signal from the peak.

The derivation unit 24 inputs the received signal 200 and also inputs from the symbol timing synchronization unit 22 the timing of OFDM symbols and information on a boundary between an IFFT signal area and a GI area. Based on the timing of OFDM symbols and the information on the boundary between an IFFT signal area and a GI area, the derivation unit 24 derives SNRs corresponding to the OFDM symbols. A method for deriving SNRs will be discussed later. Since the derivation unit 24 derives SNRs in unit of OFDM symbol, this corresponds to deriving SNRs corresponding respectively to a plurality of hopping frequencies defined in the frequency hopping. The derivation unit 24 outputs the thus derived SNRs as a derived-value signal 210.

The delay symbol synthesizing unit 20 inputs the received signal 200 and also inputs, from the symbol timing synchronization unit 22, the timing of OFDM symbols and the information on a boundary between an IFFT signal area and a GI area. Based on the information on a boundary between an IFFT signal area and a GI area, the delay symbol synthesizing unit 20 separates the OFDM symbol in the received signal 200 into an IFFT signal area and a GI area. Then the delay symbol synthesizing unit 20 combines a delayed wave component received in the GI area with the IFFT signal area.

The FFT unit 26 performs FFT on a signal combined in the delay symbol synthesizing unit 20. As a result, time-domain signals are transformed to frequency-domain signals, and the frequency-domain signals correspond respectively to subcarrier signals. Hereinafter, an OFDM symbol corresponds to frequency-domain signals. It is assumed herein that the number of FFT points is "128" as with the IFFT points.

The equalization unit 28 performs equalization processing on subcarrier signals inputted from the FFT unit 26. That is, since the subcarrier signals contain amplitude distortion and phase distortion due to the multipath delay in the radio channel, such distortion is corrected by the equalization unit 28. The estimation of radio channel is generally needed for the execution of equalization processing. For example, the equalization unit 28 uses an LMS (Least Mean Square) algorithm or the like so as to estimate the radio channel. It is assumed herein that the radio channel is estimated subcarrier by subcarrier. Here, the equalization unit 28 outputs, as equalization data 212, the subcarrier signals on which the equalization processing has been performed.

The demapping unit 32 demaps the equalization data 212 to signal points of QPSK. The demapping unit 32 associates a signal of the combined data 206 to a signal point closest thereto among four signals points of QPSK. The demapping unit 32 inputs a derived-value signal 210.

Here, the demapping unit 32 defines beforehand a plurality of partial regions wherein the plurality of partial regions are regions obtained by dividing the phase on a phase plane according to the number of the multi-level for a phase modulation in response to the equalization data 212 and wherein the plurality of partial regions are also the regions in which the signal points serving as reference for a phase-modulated signal are assigned to a phase corresponding to a middle of each of the partial regions. That is, the number of the multi-level for the phase modulation in response to the equalization data 212 is "4", and the signal points serving as reference for a phase-modulated signal is "π/4", "3π/4", "5π/4" and "7π/4". Thus, "0 to π/2", "π/2 to π", "π to 3π/2" and "3π/2 to 2π" are the four partial regions. The demapping unit 32 adjusts the size or width of the respective partial regions according to the SNR derived by the derivation unit 24. For example, the partial region of "0 to π/2" is narrowed to the region of "π/8 to 3π/8". The demapping unit 32 adjusts the width of a partial region for each signal. This corresponds to adjusting the width of partial regions for each of the hopping frequencies.

The demapping unit 32 performs a transform on the amplitude of equalization data 212 in such a manner as to bring it closer to the straight line joining the signal points serving as reference for the phase-modulated signal. That is, if the in-phase component and the quadrature component are associated to x axis and y axis, which are orthogonal axes, respectively, then the signal points serving as reference for a phase-modulated signal are assigned at "+1, +1", "-1, +1", "-1, -1" and "+1, -1" and therefore such a transform as to bring it close to the four sides of a square joining these four points is performed. On the other hand, the demapping unit 32 performs a transform defined according to a relationship between the inputted signal and a plurality of partial regions, on the phase of equalization data 212. That is, if the equalization data 212 belongs to any of the plurality of partial regions, the demapping unit 32 performs a transform on the value of equalization data 212 in such a manner as to maintain the phase of equalization data 212. If the equalization data 212 does not belong to any of the plurality of partial regions, the demapping unit 32 performs a transform on the value of equalization data 212 in such a manner as to bring it close to the phase of a middle among the signal points serving as reference for a phase-modulated signal. The details therefor will be discussed later. The above transforms in the demapping unit 32 are carried out for the respective subcarrier signals. Finally, the demapping unit 32 outputs the transform result as the demap data 214.

The deinterleave unit 34 deinterleaves the demap data 214 according to a rule conforming to an interleave rule exercised in a transmitting apparatus (now shown). The decoding unit 36 decodes signals outputted from the deinterleave unit 34. If the coding carried out by a transmitting apparatus (not shown) is the convolutional coding, the decoding unit 36 performs Viterbi decoding.

In terms of hardware, the above-described structure can be realized by a CPU, a memory and other LSIs of an arbitrary computer. In terms of software, it can be realized by memory-loaded programs which have communication functions or the like, but drawn and described herein are function blocks that are realized in cooperation with those. Thus, it is understood by those skilled in the art that these function blocks can be realized in a variety of forms such as by hardware only, software only or the combination thereof.

Figure 12:
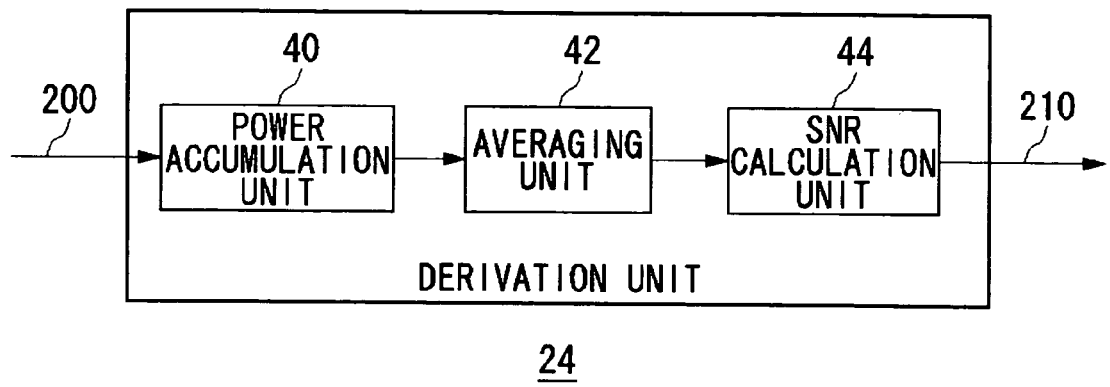
FIG. 12 illustrates a structure of a derivation unit shown in FIG. 11.

FIG. 12 illustrates a structure of the derivation unit 24. The derivation unit 24 includes a power accumulation unit 40, an averaging unit 42 and an SNR calculation unit 44.

The power accumulation unit 40 accumulates the power for an IFFT signal area in one OFDM symbol. Here, at sampling intervals where the baseband processing unit 14 operates, the power for the interval of an IFFT signal is added up. The power accumulation unit 40 accumulates also the power for a GI area in one OFDM symbol. Here, at sampling intervals where the baseband processing unit 14 operates, the power for the area of a GI is added up. Separating, in one OFDM symbol, an IFFT signal area from a GI area and vice versa is carried out based on information, inputted to the symbol timing synchronization unit 22, on a boundary between an IFFT signal area and a GI area.

The averaging unit 42 averages the power, for the interval of an IFFT signal, accumulated by the power accumulation unit 40 according to the number of samples or the measurement size in the interval of an IFFT signal interval. The averaging unit 42 carries out the similar processing in the GI area. In other words, it is difficult to perform a single processing directly on both the accumulated power for the interval of an IFFT signal and the accumulated power for the GI area. This is because the length of the interval of an IFFT signal differs from the length of a GI area. Thus, the averaging unit 42 carries out the averaging processing so that the processing can be executed among these.

The SNR calculation unit 44 inputs from the averaging unit 42 the averaged power for an IFFT signal area and the averaged power for a GI area. In the SNR calculation unit 44, the averaged power for an IFFT signal area is divided by the averaged power for a GI area, so as to derive an SNR. Now, the delay waves are also received in the GI area, so that the averaged power for a GI area differs from the intact noise level. However, since the averaged power for a GI area is generally lower than the averaged power for an IFFT signal area, it is regarded as the proper noise level. As the averaged power for a GI area, the power for a rear part of the GI area may be averaged. In this case, the effect of delayed waves can be redcued. The SNR calculation unit 44 outputs the thus derived SNR as a derived-value signal 210.

Figure 13:
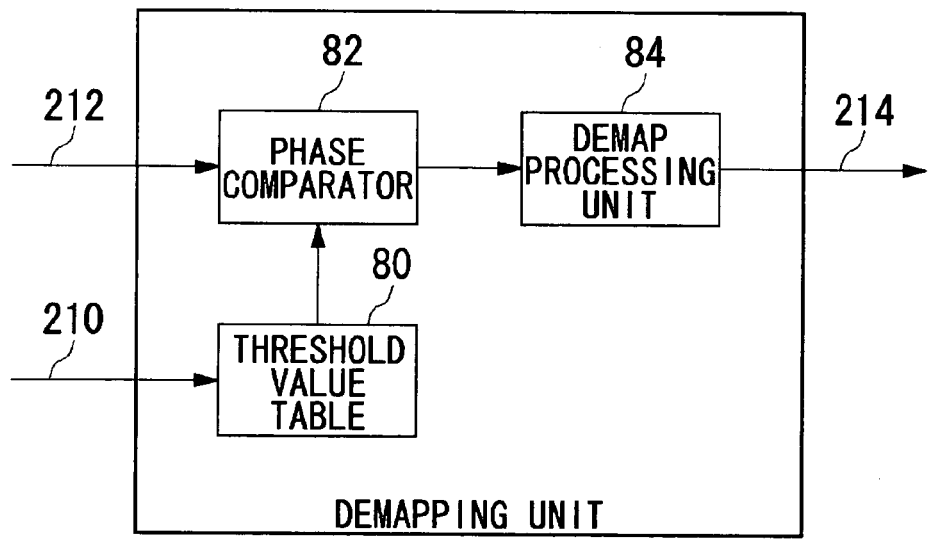
FIG. 13 illustrates a structure of a demapping unit shown in FIG. 11.

FIG. 13 illustrates a structure of a demapping unit 32. The demapping unit 32 includes a threshold value table 80, a phase comparator 82 and a demap processing unit 84.

Figure 14:
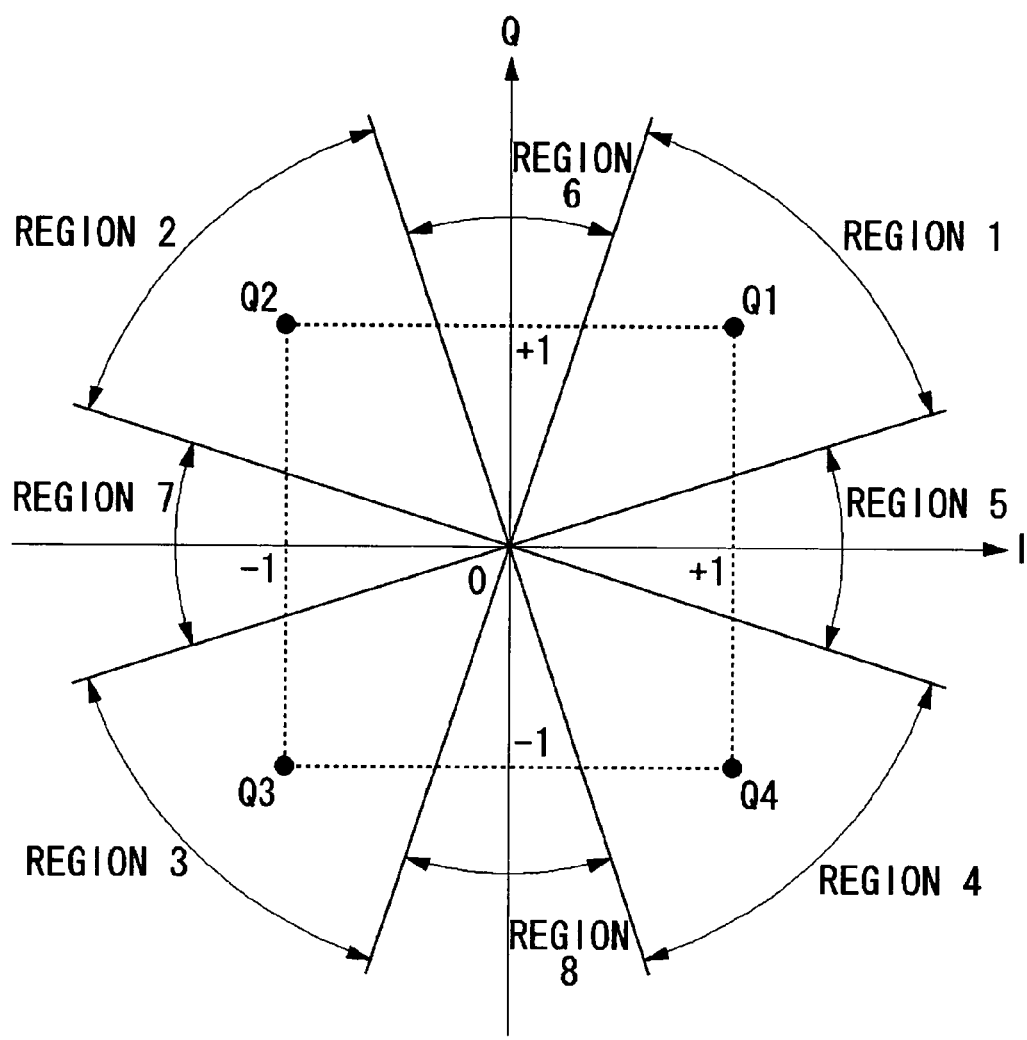
FIG. 14 illustrates a constellation in a threshold value table of FIG. 13.

The threshold value table 80 stores information on the signal points serving as reference for QPSK and information on a plurality of partial regions. The threshold value table 80 also adjusts the size of a partial region based on a derived-value signal 210. FIG. 14 illustrates a constellation in the threshold value table 80. The "I" and "Q" in FIG. 14 represent the in-phase component and the quadrature phase component, respectively. The signal points "Q1", "Q2", "Q3" and "Q4" are the signal points serving as reference for QPSK, which are respectively positioned at "+1, +1", "-1, +1", "-1, -1" and "+1, -1". In phase, they are "π/4", "3π/4", "5π/4" and "7π/4", respectively.

The signal points "Q1", "Q2", "Q3" and "Q4" are placed in the center of their respective phases, and four partial regions, namely, "region 1", "region 2", "region 3" and "region 4", are provided in correspondence to the signal points "Q1", "Q2", "Q3" and "Q4", respectively. Here, region 1 is located in the first quadrant, region 2 in the second quadrant, region 3 in the third quadrant and region 4 in the fourth quadrant. Provided also are regions 5 to 8, which are regions not included in regions 1 to 4. For example, region 5 is provided between region 4 and region 1. The dotted lines in FIG. 14 are the straight lines joining "Q1", "Q2", "Q3" and "Q4", which are the signal points serving as reference for QPSK. For example, the straight line joining "Q1" and "Q2" leads from "+1, +1" to "−1, +1" via "0, +1".

The threshold value table 80 changes the size of "regions 1 to 4" based on the SNRs contained in the derived value signal 210. Here, the larger the SNR, the wider the "regions 1 to 4" will be made, and the smaller the SNR, the narrower the "regions 1 to 4" will be made. It is to be noted that restrictions in widening the "regions 1 to 4" are such that they are to lie in the first to fourth quadrants, respectively. In other words, there must be no overlapping of "regions 1 to 4". Note also that the "regions 1 to 4" are collectively referred to as the partial regions.

"Regions 5 to 8", which are placed between "regions 1 to 4", change their size as the size of "regions 1 to 4" changes. That is, if "regions 1 to 4" widen, "regions 5 to 8" will narrow. FIG. 15 illustrates a structure of data stored in the threshold value table 80. As shown in FIG. 15, the values of SNR are so defined as to correspond to the phase width of the regions, respectively.

Referring back to FIG. 13, the phase comparator 82 compares the signal points of equalization data 212 with the signal points as shown in FIG. 14. In other words, the phase comparator 82 determines which of "regions 1 to 8" the equalization data 212 belongs to.

Figure 16:
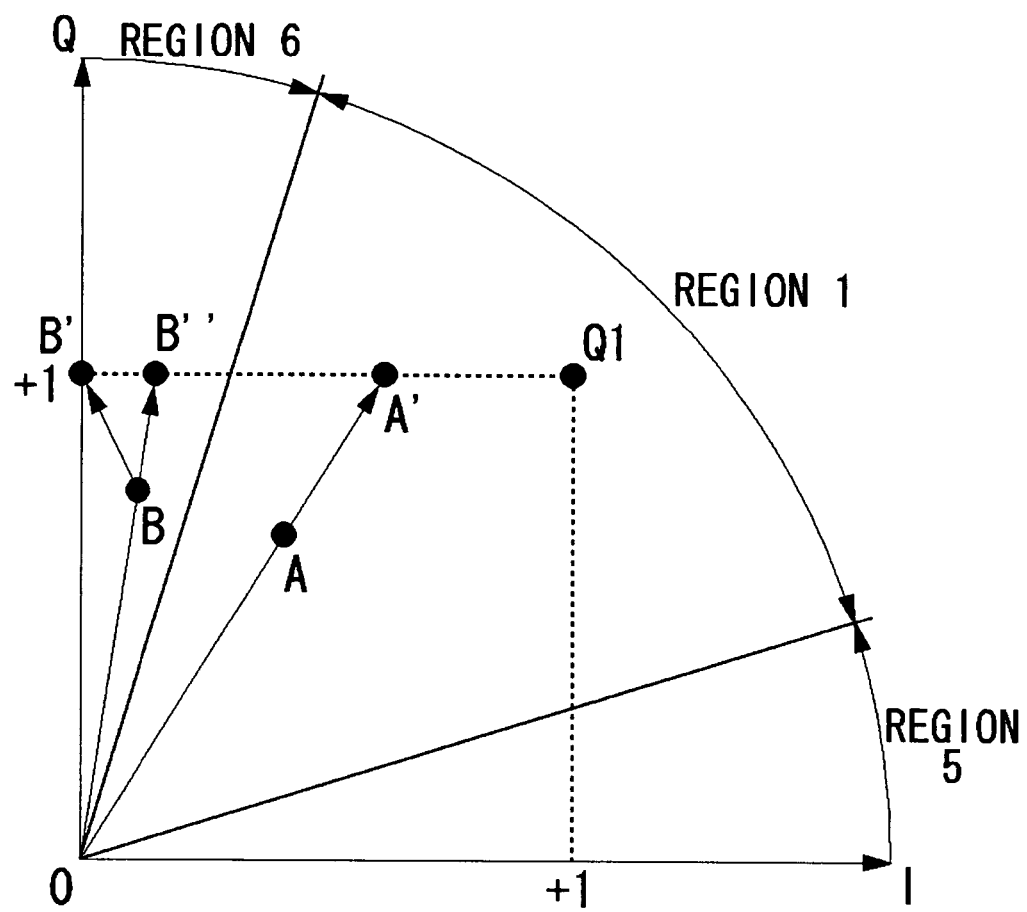
FIG. 16 outlines an operation in the demap processing unit of FIG. 13.

The demap processing unit 84 determines the constellation of signal points based on the results of judgment by the phase comparator 82. Here, the processing by the demap processing unit 84 differs depending on whether the equalization data 212 belongs to "regions 1 to 4" or "regions 5 to 8". Such processing is explained hereinbelow by referring to FIG. 16. FIG. 16 outlines an operation in the demap processing unit 84. Here, only the first quadrant of FIG. 14 is shown and, in consequence, "region 1", "region 5" and "region 6" only are shown.

A description will be given hereinbelow of a case where the equalization data 212 belongs to "region 1". The equalization data 212 corresponds to point "A". The demap processing unit 84 performs a transform on the amplitude of equalization data 212 in such a manner as to bring it closer to the straight line joining the signal points serving as reference for QPSK, while maintaining the phase of the equalization data 212. Here, similar to FIG. 14, the straight lines joining the signal points serving as reference for QPSK are shown in dotted lines, and the demap processing unit 84 converts point "A" to point "A'". Finally, the demap processing unit 84 outputs a bit value corresponding to the point "A'". It is to be noted that the demapping processing as described above is referred to as the "first processing".

Next, a description will be given hereinbelow of a case where the equalization data 212 does not belong to "region 1" but belongs to "region 6" instead. The equalization data 212 corresponds to point "B". The demap processing unit 84 performs a transform on the phase of the equalization data 212 in such a manner as to bring it closer to the phase in the middle of the signal points serving as reference for QPSK and also performs a transform on the amplitude of equalization data 212 in such a manner as to bring it closer to the straight line joining the signal points serving as reference for QPSK. Note that in the case of "region 6" the "phase in the middle of the signal points serving as reference for QPSK" is equal to the phase midway between the signal points "Q1" and "Q2" placed respectively in "region 1" and "region 2", which hold region 6 in between. In other words, it is equivalent to "π/2".

Hence the demap processing unit 84 transform point "B" to point "B'". According to the conversion rule in "region 1", however, point "B" is converted into point "B''". Here, it is possible that the point "B", which is near the Q axis, belongs to the second quadrant instead of the first quadrant. To facilitate the determination of the second quadrant in relation to the other signal points in the process of decoding, the demap processing unit 84 transforms the signal point to the phase midway between the first quadrant and the second quadrant. Finally, the demap processing unit 84 outputs a bit value corresponding to the point "B'". The demapping processing as described above is referred to as a "second processing".

Figure 17:
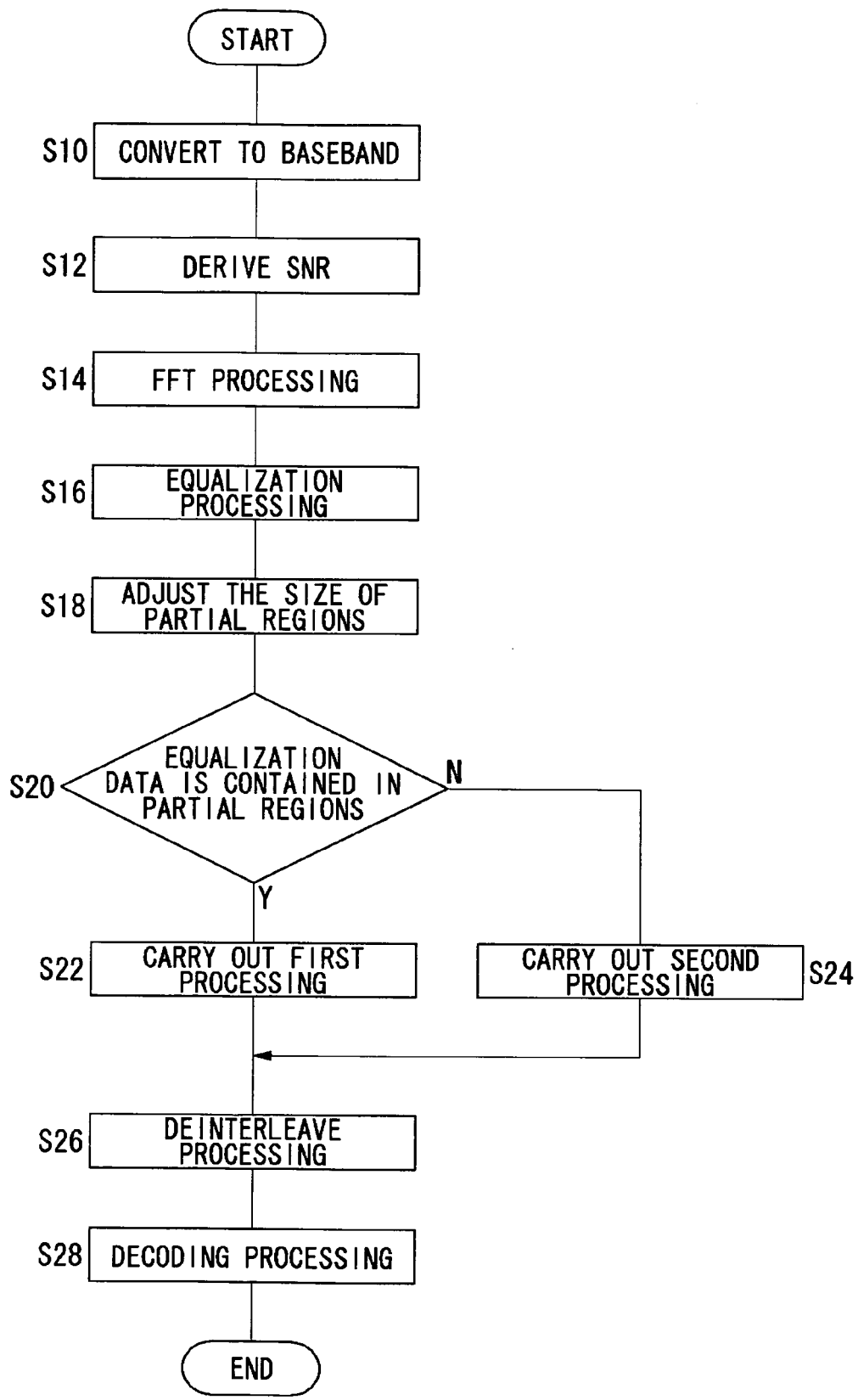
FIG. 17 is a flowchart showing a procedure of receiving processing in the receiving apparatus of FIG. 1.

An operation of the receiving apparatus structured as above will be described. FIG. 17 is a flowchart showing a procedure of receiving processing in the receiving apparatus of FIG. 1. For the signals which have been subjected to the frequency hopping in units of OFDM symbol, the radio unit 12 converts the frequency thereof from radiofrequency to baseband frequency (S10) so as to be outputted as a received signal 200. The symbol timing synchronization unit 22 extracts the timing of OFDM symbols from the symbol timing synchronization unit 22. The derivation unit 24 inputs the timing of OFDM symbols from the symbol timing synchronization unit 22 and calculates an SNR of each OFDM symbol in the received signal 200 (S12). Then the derivation unit 24 outputs the result thereof as a derived-value signal 210. Of the OFDM symbols of the received signal 200, the delay symbol synthesizing unit 20 combines a signal in the IFFT signal area with a signal in the GI area.

The FFT unit 26 performs FFT on the signal combined by the delay symbol synthesizing unit 20 (S14). The equalization unit 28 estimates the characteristics of a radio channel from a preamble and equalizes the signal which has undergone FFT in the FFT unit 26 (S16), so as to be outputted as equalization data 204. Based on the SNRs contained in the derived-value signal 210, the demapping unit 32 adjusts the width of partial regions (S18). If the signal points of the equalization data 212 belong to a partial region (Y of S20), the demapping unit 32 carries out the first processing (S22) and outputs the result thereof as demap data 214. If the signal points of the equalization data 212 do not belong to a partial region (N of S20), the demapping unit 32 carries out the second processing (S24) and outputs the result thereof as demap data 214. The deinterleave unit 34 deinterleaves the demap data 214. The decoding unit 36 decodes the signal deinterleaved by the deinterleave unit 34.

Next, a modified form of the second embodiment will be described. According to the description so far, the derivation unit 24 calculates SNRs from received signals 200 to determine the width of partial regions. According to this modification, the derivation unit 24 derives signal strength from the received signal 200. Thus, in this modification, the weighting factors can be derived even when the signal is transmitted during a GI period.

Figure 18:
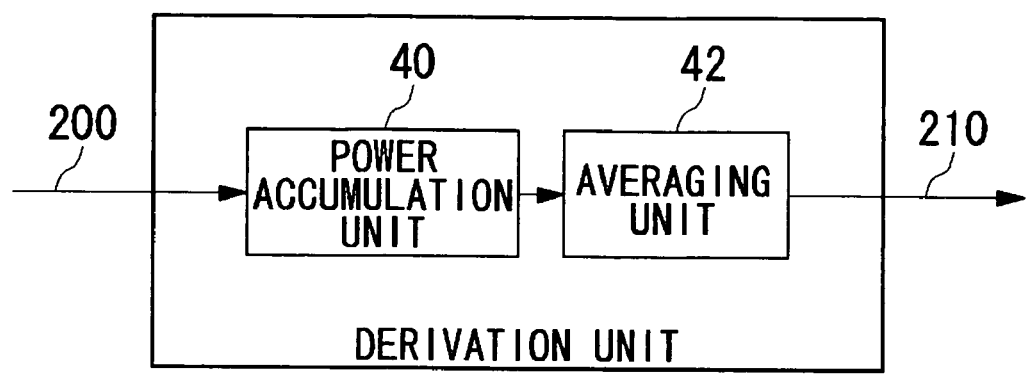
FIG. 18 illustrates another structure of a derivation unit shown in FIG. 11.

FIG. 18 illustrates another structure of a derivation unit 24. The derivation unit 24 includes a power accumulation unit 40 and an averaging unit 42.

The power accumulation unit 40 integrates power for one OFDM symbol. Here, the power for the interval of an OFDM is added up at the sampling intervals in which the baseband processing unit 14 operates. The averaging unit 42 averages the power for the interval of an OFDM accumulated by the power accumulation unit 40 according to the number of samples or the measurement size. The averaging unit 42 outputs the averaged power as a derived-value signal 210.

In such a modification as above, a received signal 200, which is a signal having undergone a predetermined coding and also a phase modulation, is inputted to the baseband processing unit 14. Here, the OFDM symbol signal is formed by IFFT signals and GIs, and the GI may be in a non-transmission interval or a part of the IFFT signal area may be transmitted. In the latter case, the GI may be assigned anterior to the IFFT signal.

According to the second embodiment, if a signal point of an inputted signal does not belong to a partial region, it will be converted into one in the phase midway between a plurality of signal points, so that an error correction can be performed easily for such a value, thus reducing the drop of error correction capacity. And if a signal point of an inputted signal belongs to a partial region, then the value of the signal will be converted in such a manner as to maintain the phase of the signal, so that the degree of certainty of a signal can be reflected in the error correction. The width of partial regions is adjusted according to SNRs, so that when the SNR of an inputted signal is small, the region to be converted into the phase midway between a plurality of signal points can be made wider.

The width of partial regions is adjusted according to the SNR of an inputted signal, and when the signal points of the inputted signal do not belong to the partial regions, the signal is converted into a value by which the presence of a plurality of signal points can be determined. Thus, even when the SNR of the inputted signal becomes small, the occurrence of errors may be restricted by narrowing the width of partial regions and then outputting a value by which the presence of a plurality of signal points can be determined. Since the SNR is derived from the powers for the transmission interval and the non-transmission interval in an OFDM symbol, an SNR according to the characteristics of a radio channel can be measured. Moreover, the SNR can be measured in a simplified manner. Since the width of partial regions is adjusted according to the SNR, the adjustment can be made using criteria suiting the characteristics of a radio channel. The quality of communications can be improved. Since the SNR is derived for each of the OFDM symbols, the width of partial regions can be so adjusted as to conform to fluctuations in the radio channel. The drop in error correction capacity can be prevented even when there is variation in the radio channel.

The SNR is derived for each hopping frequency, the size of partial regions can be adjusted in correspondence to frequency hopping. This adjustment can also be used in response to multicarrier signals. The width of partial regions is adjusted according to the signal strength of an inputted signal, and when the signal points of the inputted signal do not belong to the partial regions, the signal is converted into a value by which the presence of a plurality of signal points can be determined, so that even when the signal strength of the inputted signal becomes small, the occurrence of errors can be prevented by narrowing the width of partial regions and then outputting a value by which the presence of a plurality of signal points can be determined. Since the size of partial regions is adjusted based on the signal strength, this adjustment can be used even when there is no non-transmission interval in the OFDM symbol. Since SNRs are not calculated, the processing can be simplified. The present embodiment can be applied to a variety of communication systems.

The present invention has been described based on the embodiments which are only exemplary. It is therefore understood by those skilled in the art that other various modifications to the combination of each component and process thereof are possible and that such modifications are also within the scope of the present invention.

In the first or the second embodiment of the present invention, the receiving apparatus 100 receives multicarrier signals. The arrangement, however, is not limited thereto, and the signals may be other than the multicarrier signals. In such a case, "OFDM symbol" in the description of the above embodiments and modifications will be simply replaced by "symbol". Also, the processing for each subcarrier will be replaced by the processing for one carrier. According to this modification, the present invention can be applied to communication systems designed for single carriers. That is, it can be applied if the signal is formed so that the same symbols repeat themselves at predetermined intervals.

In the first embodiment of the present invention, the receiving apparatus 100 receives symbols of the same content consecutively. The arrangement, however, is not limited thereto, and the symbols of the same content may be other than consecutive. In such a case, the receiving apparatus 100 performs the same processing as described in the above embodiment at the timing when the symbols of the same content are received. According to this modification, the present invention can be applied to a signal format in which symbols of the same content are transmitted but they are not consecutive. That is, it can be applied so long as the receiving apparatus 100 grasps the regularity of the repetition of the symbols of the same content. It is only necessary that the symbols of the same content are received at different timings with respect to time.

In the first embodiment of the present invention, the receiving apparatus 100 receives frequency-hopped signals. The arrangement, however, is not limited thereto, and the receiving apparatus 100 may receive signals which have not been subjected to frequency hopping. According to this modification, the present invention can be applied to a variety of communication systems. Such an application can achieve the effect of time diversity. That is, it can be applied so long as the signal is formatted such that the same symbols are repeated at some predetermined intervals.

In the first embodiment of the present invention, the synthesis unit 30 uses the values stored in the weighting factor table 58 as weighting factors. The arrangement, however, is not limited thereto, and the synthesis unit 30 may, for instance, use the SNRs or signal strength derived by the derivation unit 24 directly as weighting factors. According to this modification, the weighting factor table 58 may be eliminated from the arrangement as discussed already. That is, such a modification can be used if weighting factors corresponding to the characteristics of a radio channel are derived.

In the first embodiment of the present invention, the derivation unit 24 and the synthesis unit 30 derive weighting factors for each symbol. The arrangement, however, is not limited thereto, and it may be that the signal inputted to the receiving apparatus 100 is a burst signal containing a plurality of symbols and the derivation unit 24 and the synthesis unit 30 derive, respectively, weighting factors for each hopping frequency in a partial period of the burst signal. Here the "partial period" may for instance be set in the preamble. According to this modification, the period of processing can be shortened because weighting factors are derived in a partial period of the burst signal. This arrangement can also suppress the increase in power consumption. This modification can be used so long as weighting factors corresponding to the characteristics of a radio channel are derived.

In the second embodiment of the present invention, the receiving apparatus 100 receives frequency-hopped signals. The arrangement, however, is not limited thereto and, for example, a structure may be such that the receiving apparatus 100 is not receiving signals which have not been subjected to frequency hopping. According to this modification, the present invention can be applied to a variety of communication systems. Such an application can achieve the effect of time diversity. That is, it can be applied so long as the signal is received which is both phase-modulated and coded.

In the second embodiment of the present invention, the derivation unit 24 derives signal strengths and SNRs for respective symbols. The arrangement, however, is not limited thereto, and it may be that the signal inputted to the receiving apparatus 100 is a burst signal containing a plurality of symbols and the derivation unit 24 derives, respectively, signal strengths and SNRs for each hopping frequency during a partial period of the burst signal. Here the "partial period" may for instance be set in the preamble. According to this modification, the period of processing can be shortened because signal strengths and SNRs are derived in a partial period of the burst signal. This arrangement can also suppress the increase in power consumption. That is, this modification can be used so long as signal strengths and SNRs corresponding to the characteristics of a radio channel are derived.

In the second embodiment of the present invention, the signal inputted to the baseband processing unit 14 is equivalent to a signal in which two symbols of the same content are not repeated as shown in FIG. 3B. The arrangement, however, is not limited thereto, and the signal inputted to the baseband processing unit 14 may, for instance, be equivalent to a signal in which two symbols of the same content are repeated as shown in FIG. 3C. In such a case, the derivation unit 24 derives signal strengths and SNRs in consideration of the repetition counts of the symbols of the same content. For example, for the two symbols, the signal strengths and SNRs derived therefor are averaged respectively, or one thereof is selected. Furthermore, a synthesis unit that combines the two symbols of the same content are provided before the demapping unit 32. The demapping unit 32 performs a demapping processing on the symbols combined by the synthesis unit. According to this modification, the width of partial regions can be adjusted, while gaining the effect of diversity on account of synthesis of these symbols, when the symbols of the same content are repeated a predetermined number of times. Also, such modification can achieve the effect of time diversity and the effect of frequency diversity. That is, such an arrangement works so long as signal strengths and SNRs corresponding to the characteristics of a radio channel are derived.

In this case, the receiving apparatus 100 are receiving the symbols of the same content consecutively. The arrangement, however, is not limited thereto, and it is not necessary that the symbols of the same content be consecutive. In such a case, the receiving apparatus 100 performs the processing at the timing when the symbols of the same content are received. According to this modification, the present invention can be applied to a signal format in which symbols of the same content are transmitted but are not consecutive. That is, it can be applied so long as the receiving apparatus 100 grasps the regularity of the repetition of the symbols of the same content.

The features and characteristics of the present invention described in the second embodiment may be defined by the following Item 1 and Item 2:

Item 1

A receiving apparatus, comprising:

a receiver that receives a signal which has undergone a predetermined coding and a phase modulation;

a derivation unit which derives signal strength corresponding to the signal received by the receiver;

an adjustment unit which adjusts the size of a plurality of partial regions, respectively, according to the signal strength derived by the derivation unit wherein the plurality of partial regions are regions obtained by dividing a phase on a phase plane according to the number of multi-level for the phase modulation in response to the received signal and wherein the plurality of partial regions are also the regions in which signal points serving as reference for the phase-modulated signal are assigned to a phase corresponding to a middle of each of the partial regions;

a transformation unit which performs a transform on an amplitude of the received signal in such a manner as to bring it closer to a straight line joining the signal points serving as reference for the phase-modulated signal and which performs a transform defined according to a relationship between the received signal and the plurality of partial regions, on a phase of the received signal; and a decoding unit which decodes a signal transformed by the transformation unit, wherein if the received signal belongs to any of the plurality of partial regions, the transformation unit performs a transform on a value of received signal in such a manner as to maintain the phase of received signal, whereas if the received signal does not belong to any of the plurality of partial regions, the transformation unit performs a transform on the value of received signal in such a manner as to bring it close to the phase of a middle among the signal points serving as reference for the phase-modulated signal.

Item 2

A receiving apparatus, comprising:

a receiver that receives a signal which has undergone a predetermined coding and a phase modulation;

a derivation unit which derives a signal-to-noise ratio corresponding to the signal received by the receiver;

an adjustment unit which adjusts the size of a plurality of partial regions, respectively, according to the signal-to-noise ratio derived by the derivation unit wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions;

a transformation unit which performs a transform on an amplitude of the received signal in such a manner as to bring it closer to a straight line joining the signal points serving as reference for the phase-modulated signal and which performs a transform defined according to a relationship between the received signal and the plurality of partial regions, on a phase of the received signal; and a decoding unit which decodes a signal transformed by the transformation unit, wherein each received signal is formed by a transmission interval and a non-transmission interval, wherein the derivation unit derives a signal-to-noise ratio from signal strength in a transmission interval and a non-transmission interval in each signal, and wherein if the received signal belongs to any of the plurality of partial regions, the transformation unit performs a transform on a value of received signal in such a manner as to maintain the phase of received signal, whereas if the received signal does not belong to any of the plurality of partial regions, the transformation unit performs a transform on the value of received signal in such a manner as to bring it close to the phase of a middle among the signal points serving as reference for the phase-modulated signal.

While the preferred embodiments of the present invention have been described using specific terms, such description is for illustrative purposes only, and it is to be understood that changes and variations may be made without departing from the spirit or scope of the appended claims.

What is claimed is:

1. A diversity apparatus, comprising:
an input unit which inputs a signal in which a symbol having the same content is repeated a predetermined number of times and which undergoes frequency hopping;
a derivation unit which derives weighting factors, by reflecting signal strength corresponding respectively to the symbols of the same content repeated the predetermined number of times and reflecting signal strength corresponding respectively to a plurality of hopping frequencies defined in the frequency hopping; and
a synthesis unit which combines the symbols of the same content in a manner such that the weighting factors are associated with the symbols of the same content repeated the predetermined number of times and at the same time the symbols of the same content are weighted respectively with the weighting factors.

2. A diversity apparatus according to claim 1, wherein said derivation unit updates the weighting factors, symbol by symbol, by reflecting the signal strength per symbol.

3. A diversity apparatus according to claim 1, wherein the signal inputted to said input unit is a burst signal containing a plurality of symbols, and
wherein said derivation unit derives weighting factors in units of hopping frequency, respectively, during a partial period of the burst signal.

4. A diversity apparatus according to claim 1, wherein each symbol in signals inputted to said input unit uses a plurality of carriers, and
wherein said synthesis unit combines the symbols of the same content for each of the carriers.

5. A diversity apparatus, comprising:
an input unit which inputs a signal in which a symbol having the same content is repeated a predetermined number of times and which undergoes frequency hopping;
a derivation unit which derives weighting factors, by reflecting signal-to-noise ratios corresponding respectively to the symbols of the same content repeated the predetermined number of times and reflecting signal-to-ratios corresponding respectively to a plurality of hopping frequencies defined in the frequency hopping; and
a synthesis unit which combines the symbols of the same content in a manner such that the weighting factors are associated with the symbols of the same content repeated the predetermined number of times and at the same time the symbols of the same content are weighted respectively with the weighting factors,
wherein each symbol in signals inputted to said input unit is formed by a transmission interval and a non-transmission interval, and
wherein said derivation unit derives a signal-to-noise ratio from signal strength in a transmission interval and a non-transmission interval in one symbol.

6. A diversity apparatus according to claim 5, wherein said derivation unit updates the weighting factors, symbol by symbol, by reflecting the signal-to-noise ratio per symbol.

7. A diversity apparatus according to claim 5, wherein the signal inputted to said input unit is a burst signal containing a plurality of symbols, and
wherein said derivation unit derives weighting factors in units of hopping frequency, respectively, during a partial period of the burst signal.

8. A receiving apparatus, comprising:
a receiver that receives a signal which has undergone a predetermined coding and a phase modulation;
a derivation unit which derives signal strength corresponding to the signal received by said receiver;
an adjustment unit which adjusts the size of a plurality of partial regions, respectively, according to the signal strength derived by said derivation unit wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions;
a transformation unit which performs a transform on a value of received signal in such a manner as to maintain the phase of received signal if the received signal belongs to any of the plurality of partial regions, and which performs a transform on the value of received signal in such a manner as to bring it close to the phase of a middle among the signal points serving as reference for the phase-modulated signal if the received signal does not belong to any of the plurality of partial regions; and
a decoding unit which decodes a signal transformed by said transformation unit.

9. A receiving apparatus according to claim 8, wherein said derivation unit derives the signal strength for each signal, and
wherein said adjustment unit adjusts, for each signal, the size of the partial regions.

10. A receiving apparatus according to claim 8, wherein the signal received by said receiver has undergone frequency hopping,
wherein said derivation unit derives the signal strength corresponding respectively to a plurality of hopping frequencies defined by the frequency hopping, and
wherein said adjustment unit adjusts, for each hopping frequency, the size of the partial regions.

11. A receiving apparatus according to claim 10, wherein the signal received by said receiver is a burst signal containing a plurality of signals, and
wherein said derivation unit derives the signal strength in units of hopping frequency, respectively, during a partial period of the burst signal.

12. A receiving apparatus according to claim 8, wherein a signal having the same content is repeated a predetermined number of times in the signal received by said receiver,
wherein said derivation unit derives the signal strength in consideration of the predetermined number of times that the signal having the same content is repeated, and
wherein said transformation unit performs the transform in a manner such that the combined signals of the same content serve as the received signals.

13. A receiving apparatus according to claim 8, wherein each of the signals received by said receiver uses a plurality of carriers, and
wherein said transformation unit performs the transform on the carriers, respectively.

14. A receiving apparatus, comprising:
a receiver that receives a signal which has undergone a predetermined coding and a phase modulation;
a derivation unit which derives a signal-to-noise ratio corresponding to the signal received by said receiver;
an adjustment unit which adjusts the size of a plurality of partial regions, respectively, according to the signal-tonoise ratio derived by said derivation unit wherein the plurality of partial regions are regions obtained by dividing a phase on a phase plane according to the number of multi-level for the phase modulation in response to the received signal and the plurality of partial regions are also the regions in which signal points serving as reference for the phase-modulated signal are assigned to a phase corresponding to a middle of each of the partial regions;

a transformation unit which performs a transform on a value of received signal in such a manner as to maintain the phase of received signal if the received signal belongs to any of the plurality of partial regions, and which performs a transform on the value of received signal in such a manner as to bring it close to the phase of a middle among the signal points serving as reference for the phase-modulated signal if the received signal does not belong to any of the plurality of partial regions; and a decoding unit which decodes a signal transformed by said transformation unit, wherein each signal received by said receiver is formed by a transmission interval and a non-transmission interval, and wherein said derivation unit derives a signal-to-noise ratio from signal strength in a transmission interval and a non-transmission interval in each signal.

15. A receiving apparatus according to claim 14, wherein said derivation unit derives the signal strength for each signal, and wherein said adjustment unit adjusts, for each signal, the size of the partial regions.

16. A receiving apparatus according to claim 14, wherein the signal received by said receiver has undergone frequency hopping, wherein said derivation unit derives signal-to-noise ratios corresponding respectively to a plurality of hopping frequencies defined by the frequency hopping, and wherein said adjustment unit adjusts, for each hopping frequency, the size of the partial regions.

17. A receiving apparatus according to claim 16, wherein the signal received by said receiver is a burst signal containing a plurality of signals, and wherein said derivation unit derives the signal-to-noise ratios in units of hopping frequency, respectively, during a partial period of the burst signal.

18. A receiving apparatus according to claim 14, wherein a signal having the same content is repeated a predetermined number of times in the signal received by said receiver, wherein said derivation unit derives the signal-to-noise ratios in consideration of the predetermined number of times that the signal having the same content is repeated, and wherein said transformation unit performs the transform in a manner such that the combined signals of the same content serve as the received signals.

* * * * *